(12) United States Patent
Begg et al.

(10) Patent No.: US 11,926,137 B2
(45) Date of Patent: Mar. 12, 2024

(54) COMPOSITE FOAM ARTICLE

(71) Applicant: Proprietect L.P., Toronto (CA)

(72) Inventors: David M. Begg, Etobicoke (CA);
Kevin Liping Dong, Woodbridge (CA);
Dorota Ulman, Mississauga (CA);
Scott D. Wheeler, Stoney Creek (CA);
Le-Cheng Jimmy Lin, Vaughan (CA)

(73) Assignee: Proprietect L.P., Toronto (CA)

(*) Notice: Subject to any disclaimer, the term of this patent is extended or adjusted under 35 U.S.C. 154(b) by 34 days.

(21) Appl. No.: 17/278,859

(22) PCT Filed: Sep. 25, 2019

(86) PCT No.: PCT/IB2019/058147
§ 371 (c)(1),
(2) Date: Mar. 23, 2021

(87) PCT Pub. No.: WO2020/065561
PCT Pub. Date: Apr. 2, 2020

(65) Prior Publication Data
US 2022/0032577 A1 Feb. 3, 2022

Related U.S. Application Data

(60) Provisional application No. 62/845,477, filed on May 9, 2019, provisional application No. 62/736,292, filed on Sep. 25, 2018.

(51) Int. Cl.
*B32B 5/24* (2006.01)
*B29C 43/00* (2006.01)
(Continued)

(52) U.S. Cl.
CPC ............ *B32B 5/245* (2013.01); *B29C 43/003* (2013.01); *B29C 43/203* (2013.01);
(Continued)

(58) Field of Classification Search
CPC ..... B29L 2009/00; B32B 1/02; B32B 19/047; B32B 2037/1215; B32B 2255/102;
(Continued)

(56) References Cited

U.S. PATENT DOCUMENTS 4,107,106 A 8/1978 Dunleavy et al.
4,109,712 A 8/1978 Regan
(Continued)

FOREIGN PATENT DOCUMENTS

CN 101367287 A 2/2009
CN 101544083 A 9/2009
(Continued)

OTHER PUBLICATIONS

Chinese Search Report for Application CN 2019800753030 dated Aug. 2, 2022, 2 pages.
(Continued)

*Primary Examiner* — Yan Lan
(74) *Attorney, Agent, or Firm* — Howard & Howard Attorneys PLLC

(57) ABSTRACT

A composite foam article is disclosed herein. The composite foam article comprises a polyurethane foam core presenting a first surface and a second surface facing opposite the first surface. A first skin is disposed on the first surface and a second skin is disposed on the second surface. The polyurethane foam core has a density of 15-80 kg/m³. The first and second skins comprise a plurality of fibers and a polymeric binder. The composite foam article has a weight per unit area of 500-1000 g/m² and a strength of greater than 17 N at a post-compression thickness of greater than 2 mm when tested in according with SAE J949 at 23° C.

16 Claims, 19 Drawing Sheets

(51) Int. Cl.

| | |
|---|---|
| *B29C 43/20* | (2006.01) |
| *B29C 51/00* | (2006.01) |
| *B29C 51/16* | (2006.01) |
| *B29C 51/42* | (2006.01) |
| *B32B 1/02* | (2006.01) |
| *B32B 5/02* | (2006.01) |
| *B32B 5/18* | (2006.01) |
| *B32B 9/02* | (2006.01) |
| *B32B 9/04* | (2006.01) |
| *B32B 27/06* | (2006.01) |
| *B32B 27/08* | (2006.01) |
| *B32B 27/12* | (2006.01) |
| *B32B 27/16* | (2006.01) |
| *B32B 27/30* | (2006.01) |
| *B32B 27/32* | (2006.01) |
| *B32B 37/04* | (2006.01) |
| *B32B 37/06* | (2006.01) |
| *B32B 37/10* | (2006.01) |
| *B32B 37/18* | (2006.01) |
| *B60N 2/90* | (2018.01) |
| *B29K 23/00* | (2006.01) |
| *B29K 75/00* | (2006.01) |
| *B29K 105/04* | (2006.01) |
| *B29K 309/08* | (2006.01) |
| *B29L 9/00* | (2006.01) |
| *B60R 13/02* | (2006.01) |

(52) U.S. Cl.
CPC ............ *B29C 51/004* (2013.01); *B29C 51/16* (2013.01); *B29C 51/421* (2013.01); *B32B 1/02* (2013.01); *B32B 5/022* (2013.01); *B32B 5/024* (2013.01); *B32B 5/028* (2013.01); *B32B 5/18* (2013.01); *B32B 9/025* (2013.01); *B32B 9/046* (2013.01); *B32B 27/065* (2013.01); *B32B 27/08* (2013.01); *B32B 27/12* (2013.01); *B32B 27/16* (2013.01); *B32B 27/304* (2013.01); *B32B 27/308* (2013.01); *B32B 27/32* (2013.01); *B32B 37/04* (2013.01); *B32B 37/06* (2013.01); *B32B 37/10* (2013.01); *B32B 37/185* (2013.01); *B60N 2/90* (2018.02); *B29K 2023/08* (2013.01); *B29K 2023/12* (2013.01); *B29K 2075/00* (2013.01); *B29K 2105/04* (2013.01); *B29K 2309/08* (2013.01); *B29K 2995/0077* (2013.01); *B29L 2009/00* (2013.01); *B32B 2260/021* (2013.01); *B32B 2260/023* (2013.01); *B32B 2260/046* (2013.01); *B32B 2262/101* (2013.01); *B32B 2264/108* (2013.01); *B32B 2264/303* (2020.08); *B32B 2264/307* (2020.08); *B32B 2266/0278* (2013.01); *B32B 2270/00* (2013.01); *B32B 2305/022* (2013.01); *B32B 2305/026* (2013.01); *B32B 2305/076* (2013.01); *B32B 2305/08* (2013.01); *B32B 2305/28* (2013.01); *B32B 2305/38* (2013.01); *B32B 2307/10* (2013.01); *B32B 2307/54* (2013.01); *B32B 2307/718* (2013.01); *B32B 2307/72* (2013.01); *B32B 2307/724* (2013.01); *B32B 2307/732* (2013.01); *B32B 2309/02* (2013.01); *B32B 2309/105* (2013.01); *B32B 2310/0445* (2013.01); *B32B 2313/04* (2013.01); *B32B 2315/085* (2013.01); *B32B 2323/04* (2013.01); *B32B 2323/10* (2013.01); *B32B 2333/08* (2013.01); *B32B 2375/00* (2013.01); *B32B 2439/02* (2013.01); *B32B 2605/003* (2013.01); *B32B 2605/08* (2013.01); *B60R 13/0212* (2013.01)

(58) Field of Classification Search
CPC ........ B32B 2260/021; B32B 2260/023; B32B 2260/046; B32B 2262/0238; B32B 2262/0246; B32B 2262/0269; B32B 2262/0276; B32B 2262/062; B32B 2262/10; B32B 2262/101; B32B 2262/103; B32B 2262/105; B32B 2262/106; B32B 2262/14; B32B 2264/0257; B32B 2264/108; B32B 2264/303; B32B 2264/307; B32B 2266/0278; B32B 2270/00; B32B 2274/00; B32B 2305/022; B32B 2305/026; B32B 2305/076; B32B 2305/08; B32B 2305/28; B32B 2305/38; B32B 2307/10; B32B 2307/102; B32B 2307/51; B32B 2307/54; B32B 2307/558; B32B 2307/5825; B32B 2307/718; B32B 2307/72; B32B 2307/724; B32B 2307/732; B32B 2307/748; B32B 2309/02; B32B 2309/105; B32B 2310/0445; B32B 2313/04; B32B 2315/085; B32B 2323/04; B32B 2323/10; B32B 2333/08; B32B 2375/00; B32B 2439/02; B32B 2439/40; B32B 2479/00; B32B 2605/003; B32B 2605/08; B32B 2605/18; B32B 27/04; B32B 27/065; B32B 27/08; B32B 27/12; B32B 27/16; B32B 27/283; B32B 27/286; B32B 27/302; B32B 27/304; B32B 27/308; B32B 27/32; B32B 27/34; B32B 27/36; B32B 27/38; B32B 27/40; B32B 27/42; B32B 37/04; B32B 37/06; B32B 37/10; B32B 37/144; B32B 37/185; B32B 5/022; B32B 5/024; B32B 5/028; B32B 5/18; B32B 5/245; B32B 5/26; B32B 5/28; B32B 5/32; B32B 7/022; B32B 7/12; B32B 9/025; B32B 9/046; B29K 2023/08; B29K 2023/12; B29K 2075/00; B29K 2105/04; B29K 2309/08; B29K 2995/0077; B29C 43/003; B29C 43/203; B29C 51/004; B29C 51/16; B29C 51/421; B60R 13/0212; B60N 2/90
See application file for complete search history.

(56) References Cited

U.S. PATENT DOCUMENTS

| | | |
|---|---|---|
| 4,296,213 A | 10/1981 | Cuscurida et al. |
| 4,518,778 A | 5/1985 | Cuscurida |
| 4,729,917 A | 3/1988 | Symdra et al. |
| 4,741,945 A | 5/1988 | Brant et al. |
| 5,300,360 A | 4/1994 | Kocsis et al. |
| 5,683,796 A | 11/1997 | Kornylo et al. |
| 5,721,038 A | 2/1998 | Kornylo et al. |
| 5,928,597 A | 7/1999 | Van Ert |
| 6,146,578 A | 11/2000 | Van Ert et al. |
| 6,338,618 B1 | 1/2002 | Van Ert et al. |
| 6,368,702 B1 | 4/2002 | Erickson |
| 7,390,374 B2 | 6/2008 | Moning et al. |
| 8,282,147 B2 | 10/2012 | Dong et al. |
| 8,889,574 B2 | 11/2014 | Dolgopolsky et al. |
| 10,377,104 B2 | 8/2019 | Kaneko et al. |
| 2001/0021450 A1 | 9/2001 | Ramesh |
| 2004/0234744 A1 | 11/2004 | Byma et al. |
| 2008/0311336 A1 | 12/2008 | Dolgopolsky et al. |

(56) References Cited

U.S. PATENT DOCUMENTS

| | | | |
|---|---|---|---|
| 2009/0284048 A1* | 11/2009 | Dong | B32B 27/32 |
| | | | 428/317.1 |
| 2012/0052283 A1 | 3/2012 | Gehani | |
| 2013/0273341 A1 | 10/2013 | Albertelli et al. | |
| 2014/0323004 A1 | 10/2014 | Mihara et al. | |
| 2016/0151999 A1 | 6/2016 | Gehani | |
| 2016/0214548 A1 | 7/2016 | Moller et al. | |
| 2017/0305107 A1 | 10/2017 | Kim et al. | |

FOREIGN PATENT DOCUMENTS

| | | | |
|---|---|---|---|
| CN | 102026803 | A | 4/2011 |
| CN | 102367016 | A | 3/2012 |
| CN | 204109923 | U | 1/2015 |
| CN | 204431826 | U | 7/2015 |
| CN | 107187118 | A | 9/2017 |
| CN | 107586416 | A | 1/2018 |
| CN | 108237737 | * | 7/2018 |
| EP | 2894028 | * | 7/2015 |
| GB | 1453258 | A | 10/1976 |
| KR | 20120113550 | A | 10/2012 |
| KR | 20130039206 | A | 4/2013 |
| KR | 101394746 | B1 | 5/2014 |
| KR | 101510023 | B1 | 4/2015 |
| WO | 9964533 | A1 | 12/1999 |
| WO | 0242119 | A2 | 5/2002 |
| WO | 2016153221 | A1 | 9/2016 |
| WO | 2017210439 | A1 | 12/2017 |
| WO | 2018169851 | A1 | 9/2018 |

OTHER PUBLICATIONS

English language abstract for CN 102026803 A extracted from espacenet.com database on Aug. 3, 2022, 2 pages.
English language abstract for CN 102367016 A extracted from espacenet.com database on Aug. 3, 2022, 1 page.
English language abstract and machine-assisted English translation for KR 2012-0113550 A extracted from espacenet.com database on Nov. 15, 2022, 8 pages.
English language abstract and machine-assisted English translation for KR 2013-0039206 A extracted from espacenet.com database on Nov. 15, 2022, 11 pages.
Association of the Nonwoven Fabrics Industry (INDA), "Webpage", http://www.inda.org, 2018, 7 pages.
Dolgopolsky, I. et al., "Polyurethane Foam as an Integral "Core" Component of Automotive Headliner", Polyurethane Expo, 1999, Journal of Industrial Textiles, vol. 30, Issue 1, Jul. 1, 2000, pp. 26-41.
English language abstract for CN 107586416 A extracted from espacenet.com database on Apr. 8, 2021, 1 page.
English language abstract for CN 204109923 U extracted from espacenet.com database on Apr. 8, 2021, 1 page.
English language abstract for CN 204431826 U extracted from espacenet.com database on Apr. 8, 2021, 1 page.
English language abstract for KR 101394746 B1 extracted from espacenet.com database on Apr. 8, 2021, 1 page.
English language abstract for KR 101510023 B1 extracted from espacenet.com database on Apr. 8, 2021, 1 page.
English language abstract for WO 2016/153221 A1 extracted from espacenet.com database on Apr. 8, 2021, 2 pages.
Freudenberg, "Nonwovens: Materials, Technologies & Application Webpage", https://www.freudenberg-pm.com/Materials/Nonwoven, 2018, 4 pages.
International Search Report for Application No. PCT/IB2019/058147 dated Dec. 12, 2019, 4 pages.
International Search Report for Application No. PCT/IB2019/058150 dated Dec. 23, 2019, 4 pages.
Lopez, Gertrude, "Top Pool Companies in Oahu", Hoot Unos Magazine Black, http://www.johnrstarr.com, 2018, 5 pages.
U.S. Appl. No. 17/278,900, filed Mar. 23, 2021.
Valfilm, "Integral 780 Technical Data Sheet", Feb. 17, 2014, 1 page.
English language abstract for CN 101367287 A extracted from espacenet.com database on Aug. 16, 2022, 1 page.
English language abstract for CN 101544083 A extracted from espacenet.com database on Aug. 16, 2022, 1 page.
English language abstract for CN 107187118 A extracted from espacenet.com database on Aug. 16, 2022, 2 pages.
Chinese Search Report for Application CN 2019800752894 dated Jul. 28, 2022, 3 pages.

* cited by examiner

COMPOSITE FOAM ARTICLE

CROSS-REFERENCE TO RELATED APPLICATIONS

This application is the National Stage of International Patent Application No. PCT/IB2019/058147, filed on Sep. 25, 2019, which claims priority to and all the advantages of U.S. Provisional Patent Application No. 62/845,477, filed on May 9, 2019, and which also claims priority to and all the advantages of U.S. Provisional Patent Application No. 62/736,292, filed on Sep. 25, 2018, the contents of which are incorporated herein by reference.

FIELD OF THE DISCLOSURE

The subject disclosure generally relates to a composite foam article. The composite foam article can be used in automotive applications.

DESCRIPTION OF THE RELATED ART

In the transportation industry, there is a focus on making vehicular interiors comfortable, quiet, and aesthetically pleasing for drivers and passengers alike. In the automotive industry, interior components such as headliners, headliner substrates, visors, package trays, seats, and load floors serve structural, acoustic, and aesthetic purposes to provide drivers and passengers with a comfortable, quiet, and aesthetically pleasing driving experience.

There is a need for headliners and other components with improved performance.

SUMMARY OF THE DISCLOSURE AND ADVANTAGES

The subject disclosure provides a composite foam article. The composite foam article comprises a polyurethane foam core presenting a first surface and a second surface facing opposite the first surface. A first skin is disposed on the first surface and a second skin is disposed on the second surface. The first and second skins comprise a plurality of fibers and a polymeric binder.

In some embodiments, the polyurethane foam core has a density of from about 45 to about 80, kg/m$^3$. In these embodiments, the polyurethane foam core, the first skin, and the second skin have a pre-compression thickness of from about 2 to about 5 mm, and are compressed to form the composite foam article having a strength of greater than about 17 N at a post-compression thickness of greater than about 2 mm when tested in accordance with SAE J949 at about 23° C.

In further embodiments, the composite foam article comprises at least one supplemental layer comprising an ethylene and acrylic acid (EAA) copolymer dispersed in and/or disposed between any of said aforementioned skins and core.

BRIEF DESCRIPTION OF THE DRAWINGS

The advantages of the present disclosure will be readily appreciated as the same becomes better understood by reference to the following detailed description when considered in connection with the accompanying drawings. It is to be understood that the drawings are purely illustrative and are not necessarily drawn to scale.

DETAILED DESCRIPTION OF THE DISCLOSURE

Figure 1:
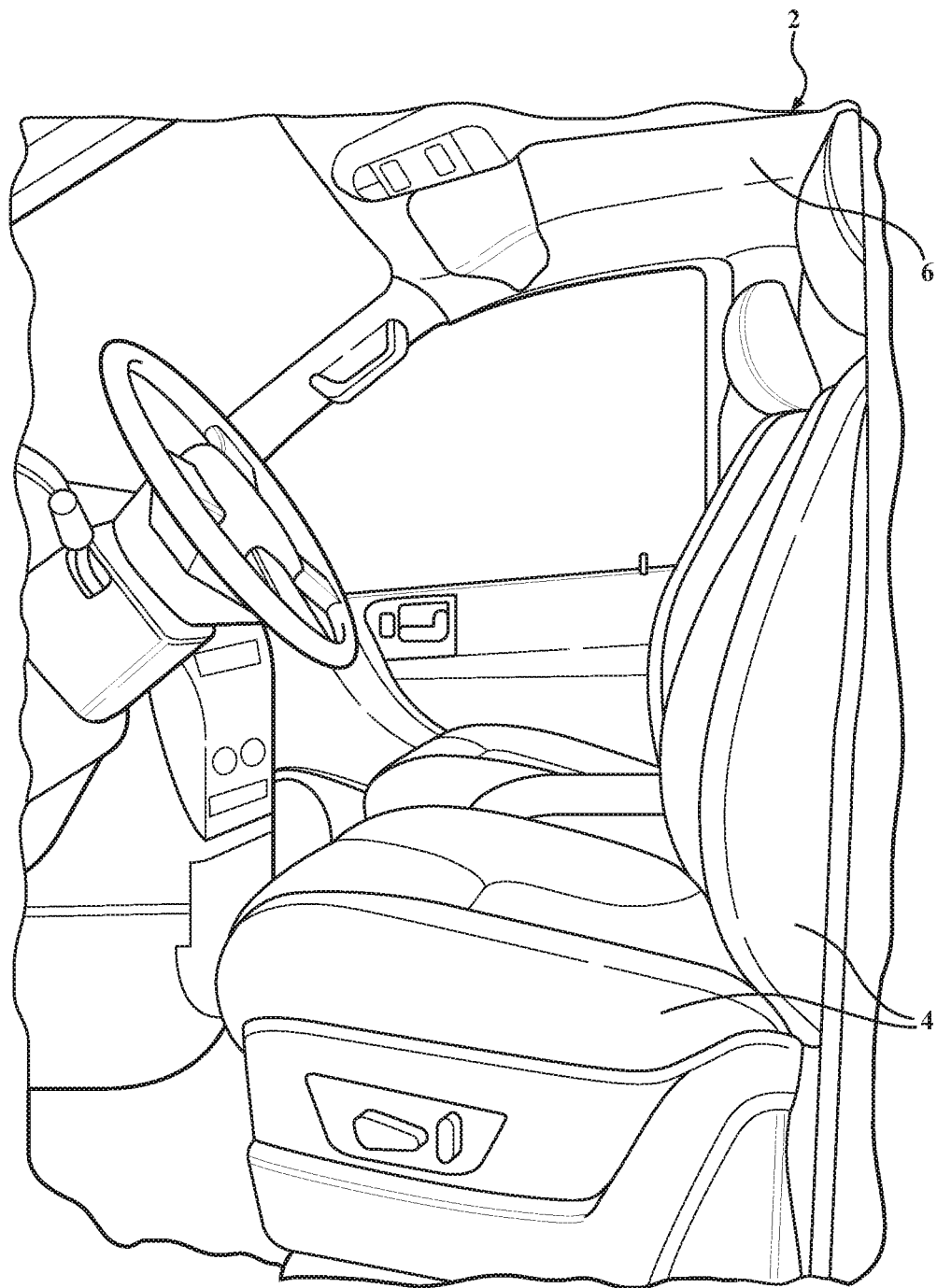
FIG. 1 is a perspective view of a vehicle interior including a seat and a headliner including the composite foam article of the subject disclosure.

A composite foam article is disclosed herein and generally shown at 10 throughout the Figures. The composite foam article 10 comprises a polyurethane foam core 12 presenting a first surface 14 and a second surface 16 facing opposite the first surface 14. A first skin 18 is disposed on the first surface 14, and a second skin 20 is disposed on the second surface 16. The composite foam article 10 is particularly suitable for use in interior automotive components such as seats, headliner substrates, headliners, visors, package trays, and load floors. Referring now to FIG. 1, the composite foam article 10 can be used in an interior automotive component within a vehicle interior 2, e.g. in a headliner 6 or in a seat 4 of an automobile.

However, the composite foam article 10 of the subject disclosure is not limited to use in the automotive industry. As one example, the composite foam article 10 is suitable for use in the aerospace industry, e.g. in airplanes. As another example, the composite foam article 10 is suitable for use in the furniture industry, e.g. in beds, couches, and chairs.

As set forth above, the composite foam article 10 includes the polyurethane foam core 12. The polyurethane foam core 12 presents a first surface 14 and a second surface 16 facing opposite the first surface 14.

The polyurethane foam core 12 includes the reaction product of an isocyanate and an isocyanate-reactive component, e.g. an active hydrogen-containing compound such as a polyol, in the presence of a blowing agent. The polyurethane foam core 12 can be an isocyanate-based polymer selected from the group of polyurethane, urea-modified polyurethane, and carbodiimide-modified polyurethane. The term "modified", when used in conjunction with a polyurethane means that up to 50% of the polymer linkages have been substituted. In some embodiments, the polyurethane foam core 12 is a semi-rigid polyurethane foam. In various preferred embodiments, the polyurethane foam core 12 is a semi-rigid polyurethane foam.

In various embodiments, the polyurethane foam core 12 is a foam type selected from at least one of viscoelastic foam, flexible foam, semi-rigid foam, and rigid foam. For example, in some embodiments, e.g. where the composite foam article 10 is a seat cushion, a seat cover, or a headliner coverstock, the polyurethane foam core 12 may comprise flexible or viscoelastic foam. In other embodiments, e.g. where the composite article 10 is a sun visor, seat back, package tray, load or a headliner substrate, the polyurethane foam core 12 may comprise semi-rigid or rigid foam. Further, the polyurethane foam core 12 can include one or more sublayers of foam. The sublayers may comprise various combinations of the foam types set forth above.

The polyurethane foam core 12 is typically formed via an exothermic reaction of an isocyanate-reactive resin composition (including polyols) and an isocyanate in the presence of a blowing agent. The isocyanate-reactive resin composition, the isocyanate, and the blowing agent, are collectively known as a polyurethane system. Suitable polyurethane foams and polyurethane systems are commercially available from The Woodbridge Group of Woodbridge, ON.

In some embodiments, including headliner embodiments, slabstock polyurethane foam is produced for the polyurethane foam core 12 in manufacturing facilities in the form of foam "buns" having dimensions such as 4 feet (height)×6 feet (width)×100 feet (length). Each bun is then cut into a plurality of shorter length (e.g. 8 feet) buns, depending on the specifications of the particular automotive headliner being produced. The shorter length bun is then sliced into sheets of appropriate thickness (e.g. 2 to 12 mm).

In some embodiments, including headliner embodiments, the polyurethane foam core 12 has an initial thickness of from about 2 to about 15, from about 2 to about 12, from about 2 to about 10, from about 2 to about 5, from about 3 to about 6, or from about 3 to about 10, mm. In various non-limiting embodiments, all values and ranges of values including and between those described above are hereby expressly contemplated for use herein.

In many embodiments, the polyurethane foam core 12 has an initial (before compression if included in a compressed interior component) density of from about 24 to about 180, from about 40 to about 120, from about 22 to about 80, from about 45 to about 80, from about 50 to about 80, or from about 55 to about 75, kg/m³. In various non-limiting embodiments, all values and ranges of values including and between those described above are hereby expressly contemplated for use herein.

Although density is not a measure of firmness, stiffness, or load bearing capacity, such properties can be characterized by Compression Force Deflection ("CFD"). In some embodiments, where the polyurethane foam core 12 is a semi-rigid foam, e.g. semi-rigid polyurethane foam for use in headliners and load floors, the polyurethane foam core 12 has a CFD at 10% deflection of from about 10 to about 120, or from about 15 to about 100, or from about 30 to about 95, or from about 40 to about 90, or from about 50 to about 90, or from about 60 to about 90, or from about 70 to about 90, PSI when tested in accordance with ASTM D3574-17-D. In various non-limiting embodiments, all values and ranges of values including and between those described above are hereby expressly contemplated for use herein.

It should be appreciated each of the layers described herein can be in included in the composite foam article 10 more than once. It should also be appreciated that each of the different types of layers described herein can include one or more sub layers comprising the materials described herein with respect to that particular layer. Further, the layers described herein can be included in different locations within the composite foam article 10. Of course, the layers can be formed with various combinations of film, powder, particles, and fibers. As will be apparent when reading the subject disclosure and referencing the corresponding figures (e.g. FIGS. 2, 11, 12, and 13), various exemplary, non-limiting embodiments that illustrate the use of different numbers of layers in different locations within the composite foam article 10 are described and contemplated herein.

As will be apparent when reading the subject disclosure and referencing the corresponding figures (e.g. FIGS. 2-5) a prime after a numeral generally denotes a second of a particular type of layer. For example, the composite foam article 10 typically includes one or more additional or supplemental polymeric layers 24. As such, a polymeric layer 24 could be located on one side of the foam core layer 12 and a second and third polymeric bonding layer 24', 24" could be located on the other side of the polyurethane foam core 12 as is illustrated in FIG. 2.

Figure 2:
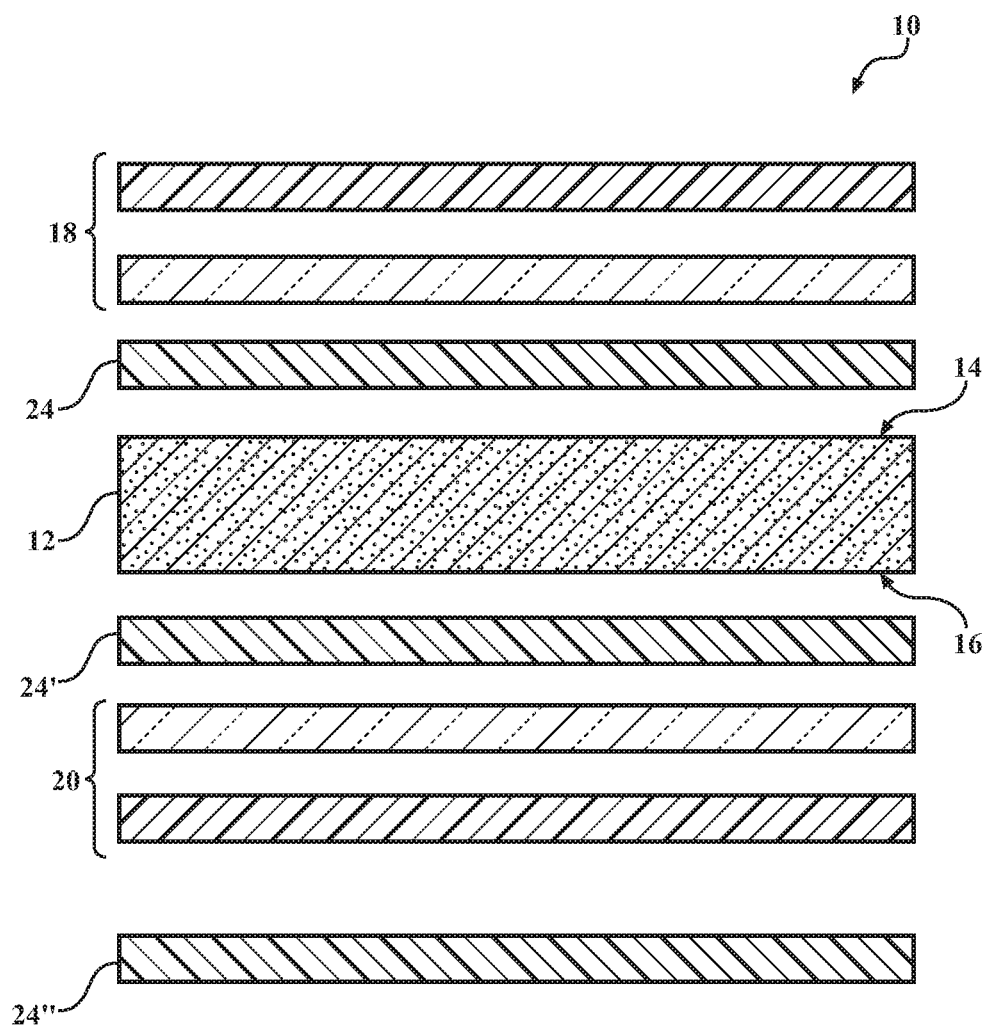
FIG. 2 is an expanded cross-sectional view of an embodiment of the composite foam article of this disclosure which can be used as an automotive headliner substrate.
Figure 3:
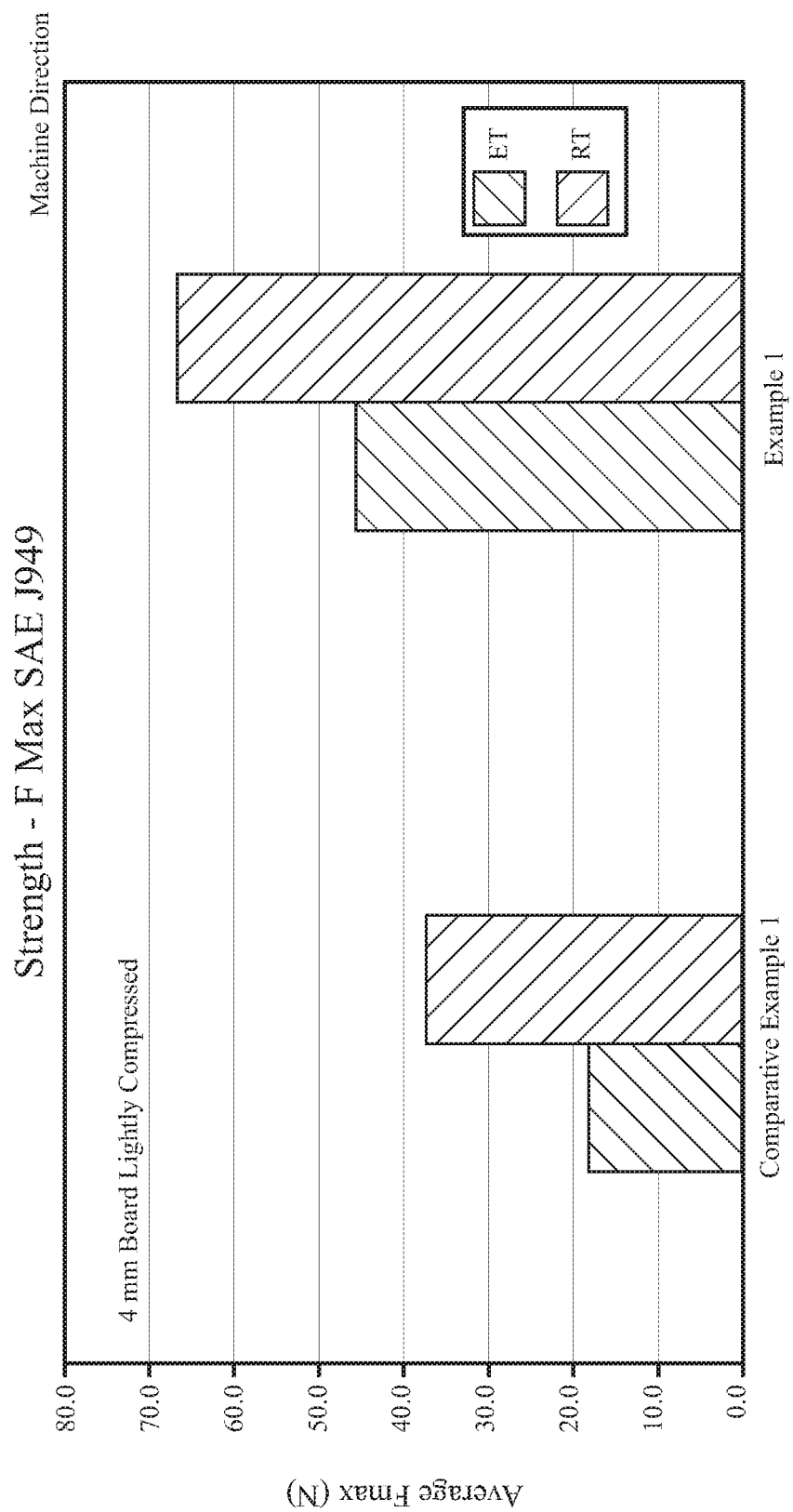
FIG. 3 is a graph illustrating the strength of the composite foam article tested in accordance with SAE J949 at a thickness of about 4 mm.
Figure 4:
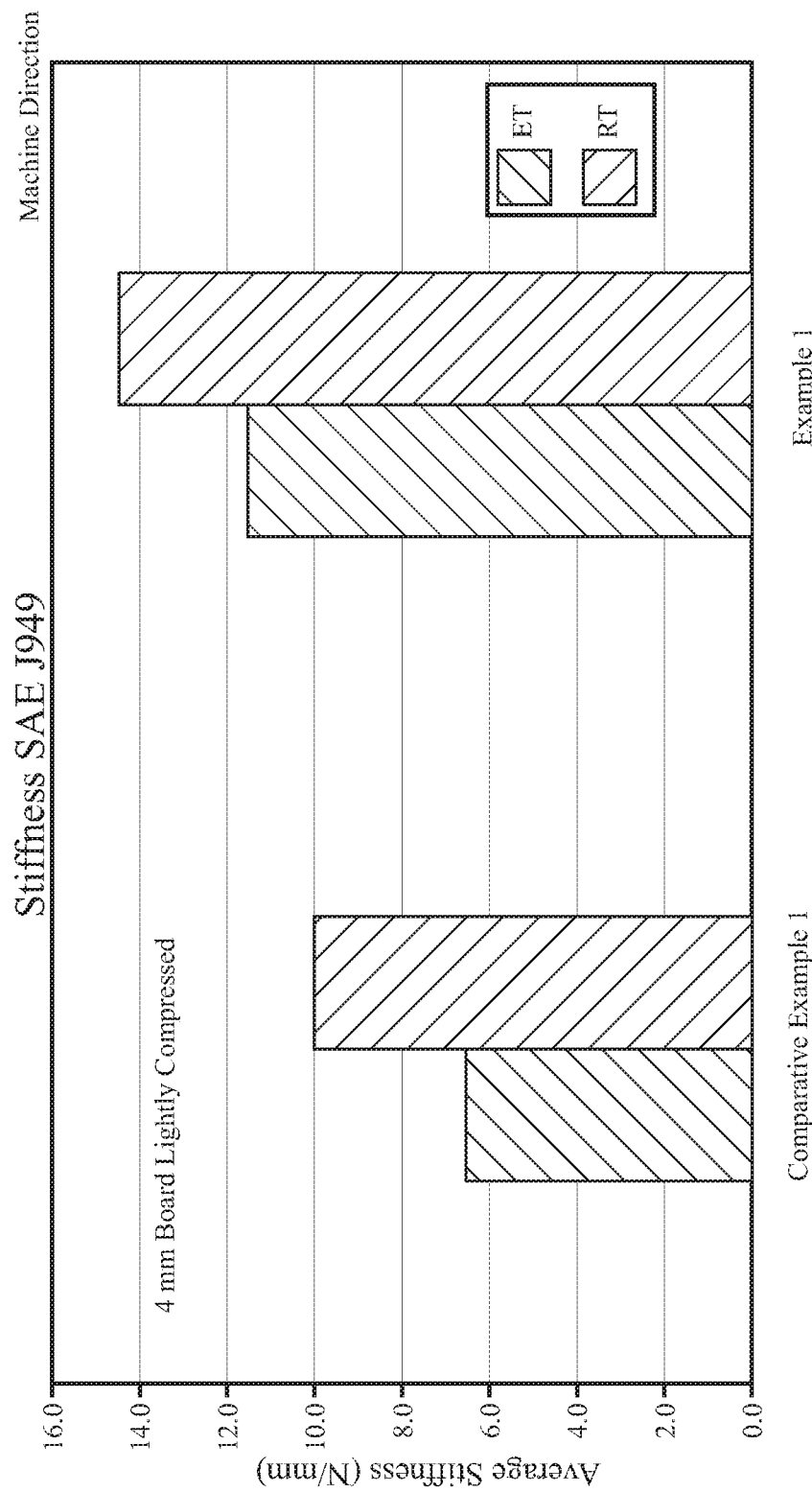
FIG. 4 is a graph illustrating the stiffness of the composite foam article tested in accordance with SAE J949 at a thickness of about 4 mm.
Figure 5:
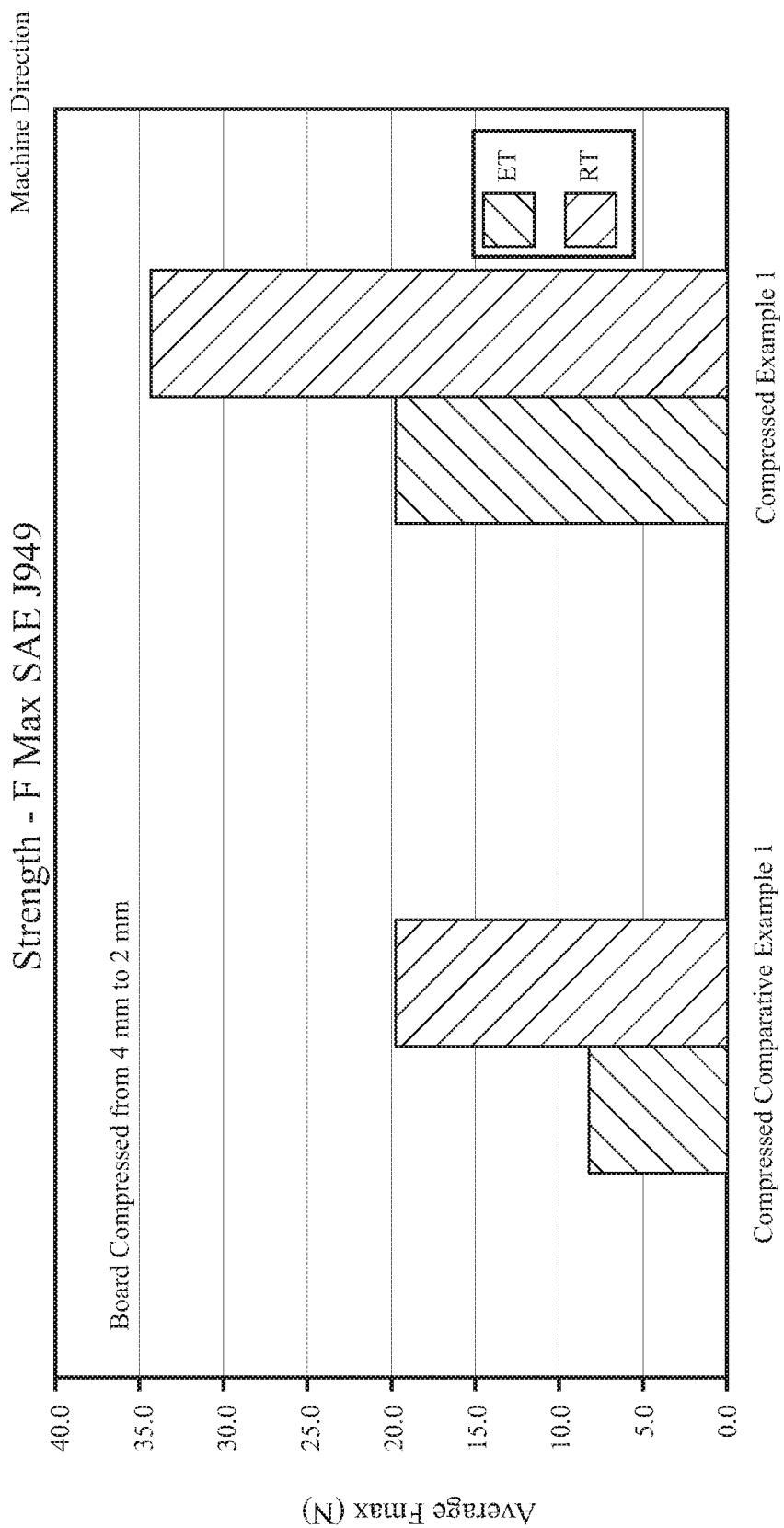
FIG. 5 is a graph illustrating the strength of the composite foam article tested in accordance with SAE J949 at a thickness of about 2 mm.
Figure 6:
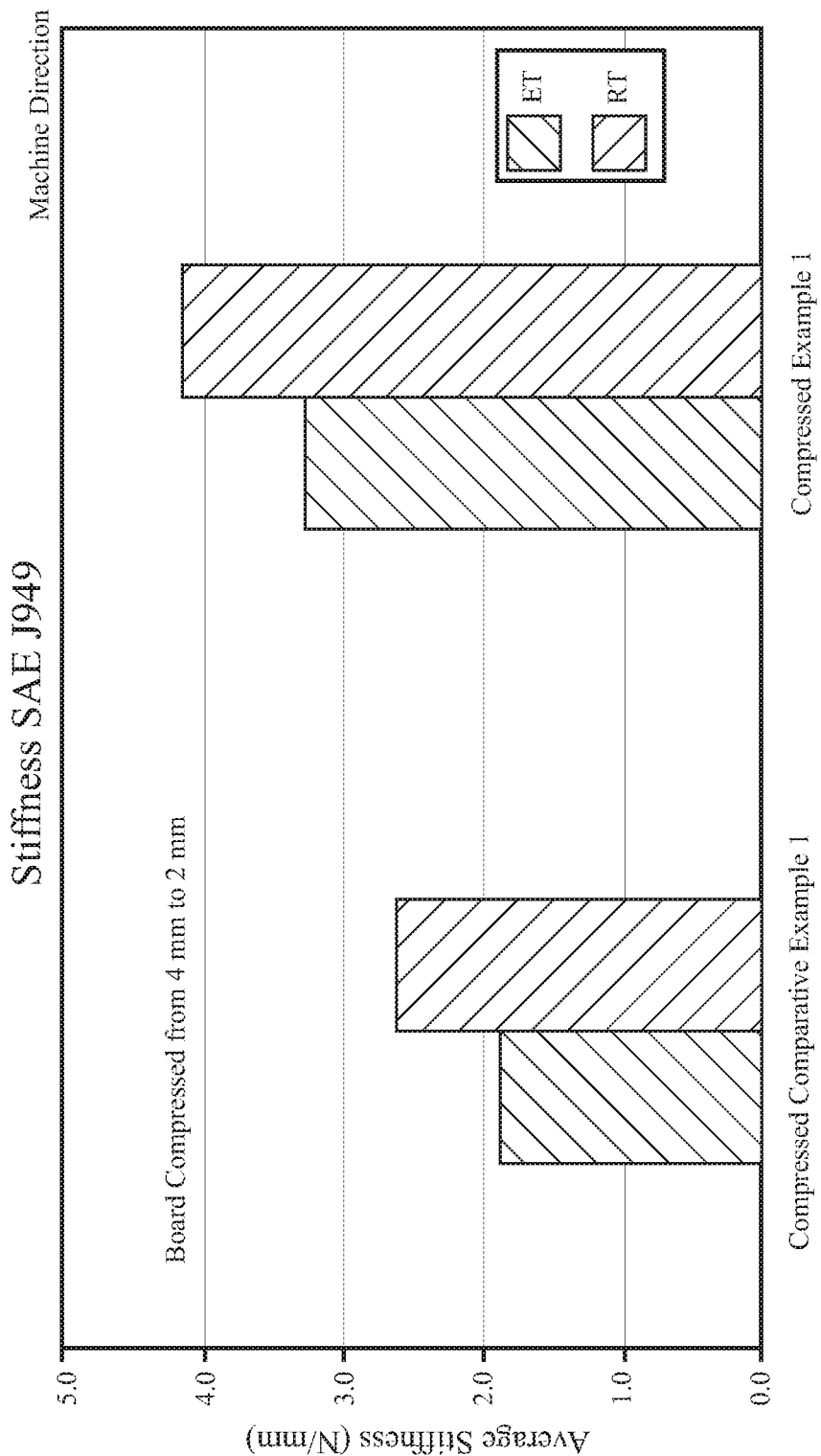
FIG. 6 is a graph illustrating the stiffness of the composite foam article tested in accordance with SAE J949 at a thickness of about 2 mm.
Figure 7:
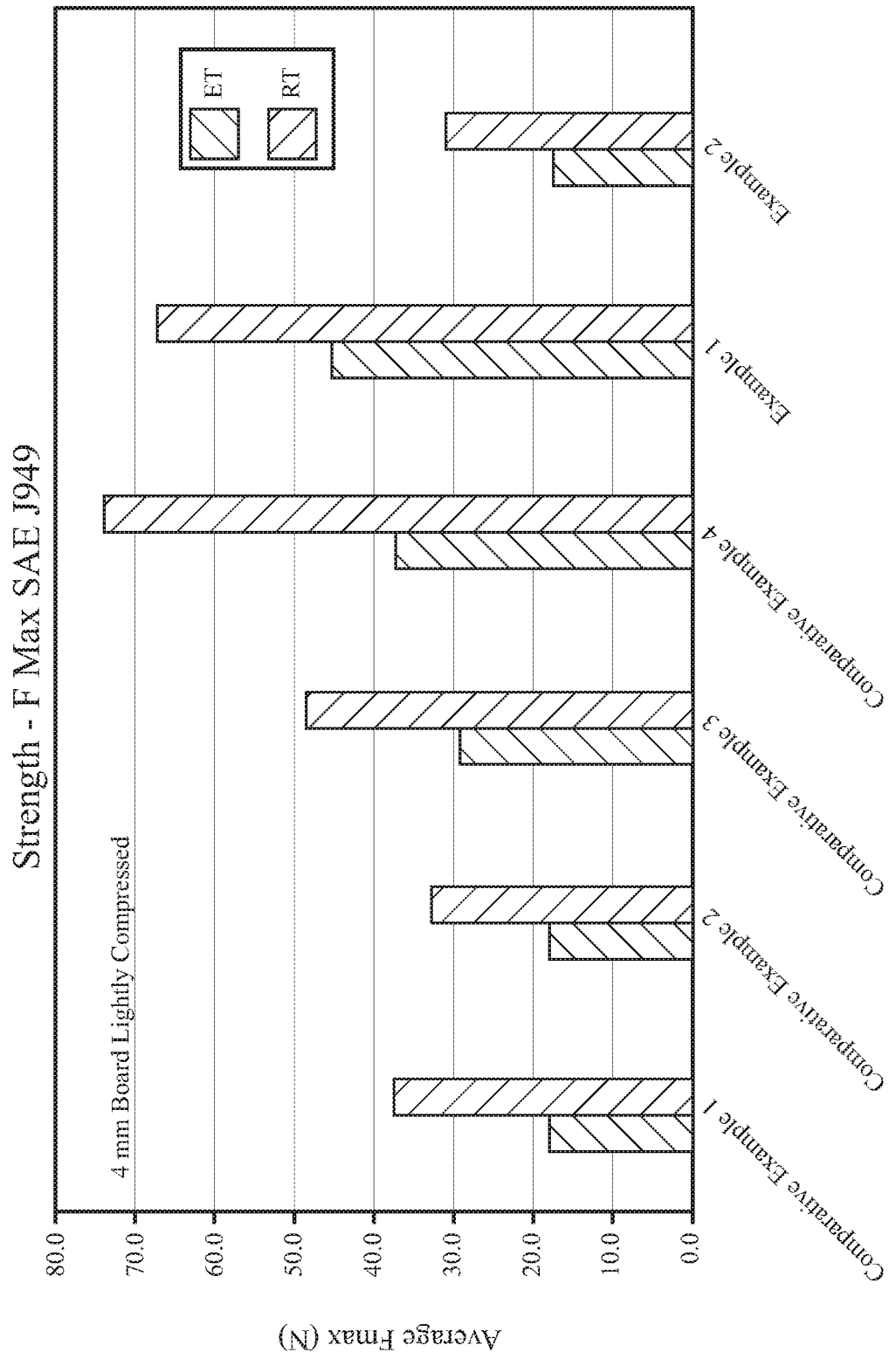
FIG. 7 is a graph illustrating the strength of the composite foam article and various comparative foam articles tested in accordance with SAE J949 at a thickness of about 4 mm.
Figure 8:
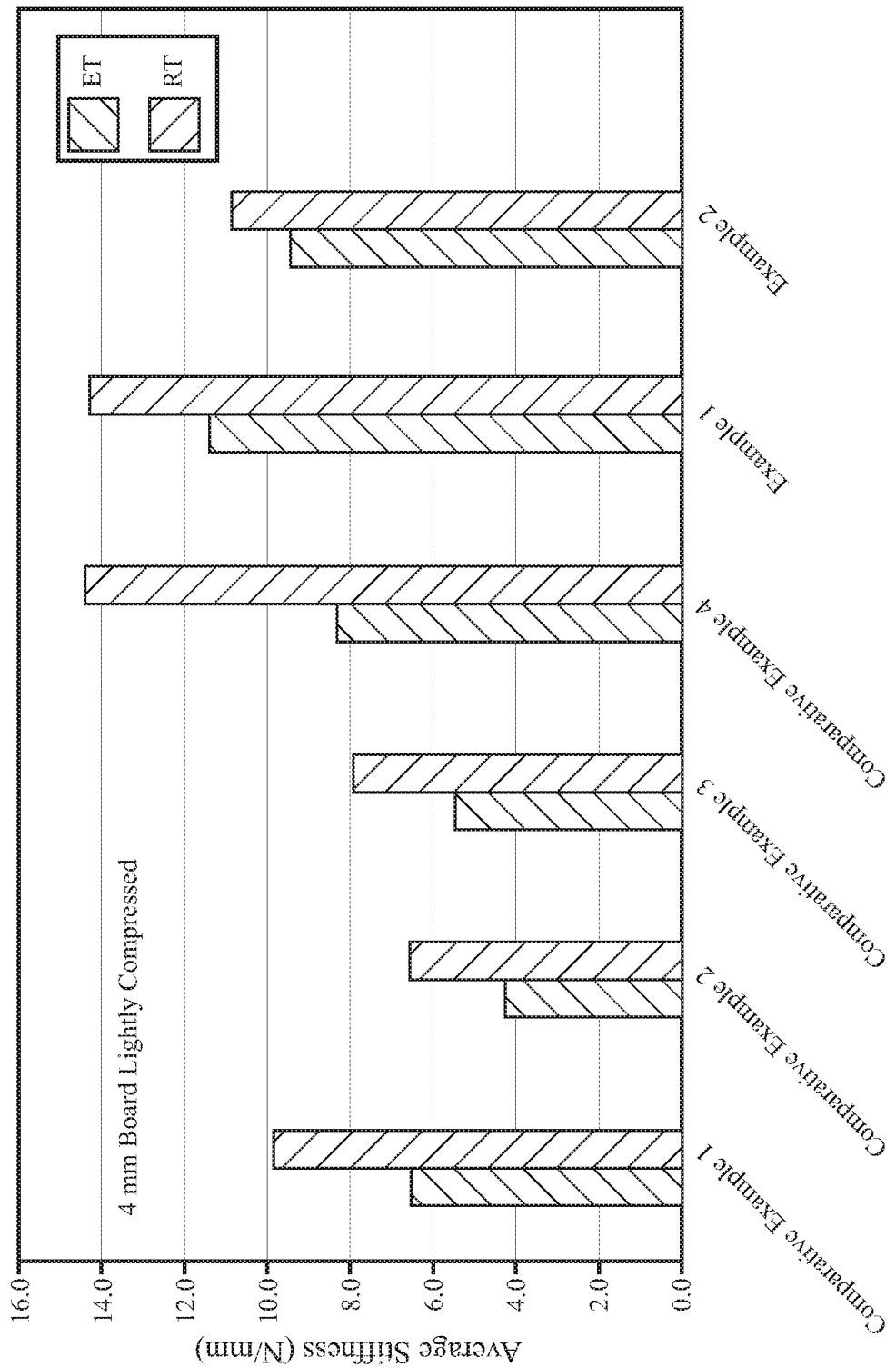
FIG. 8 is a graph illustrating the stiffness of the composite foam article and various comparative foam articles tested in accordance with SAE J949 at a thickness of about 4 mm.
Figure 9:
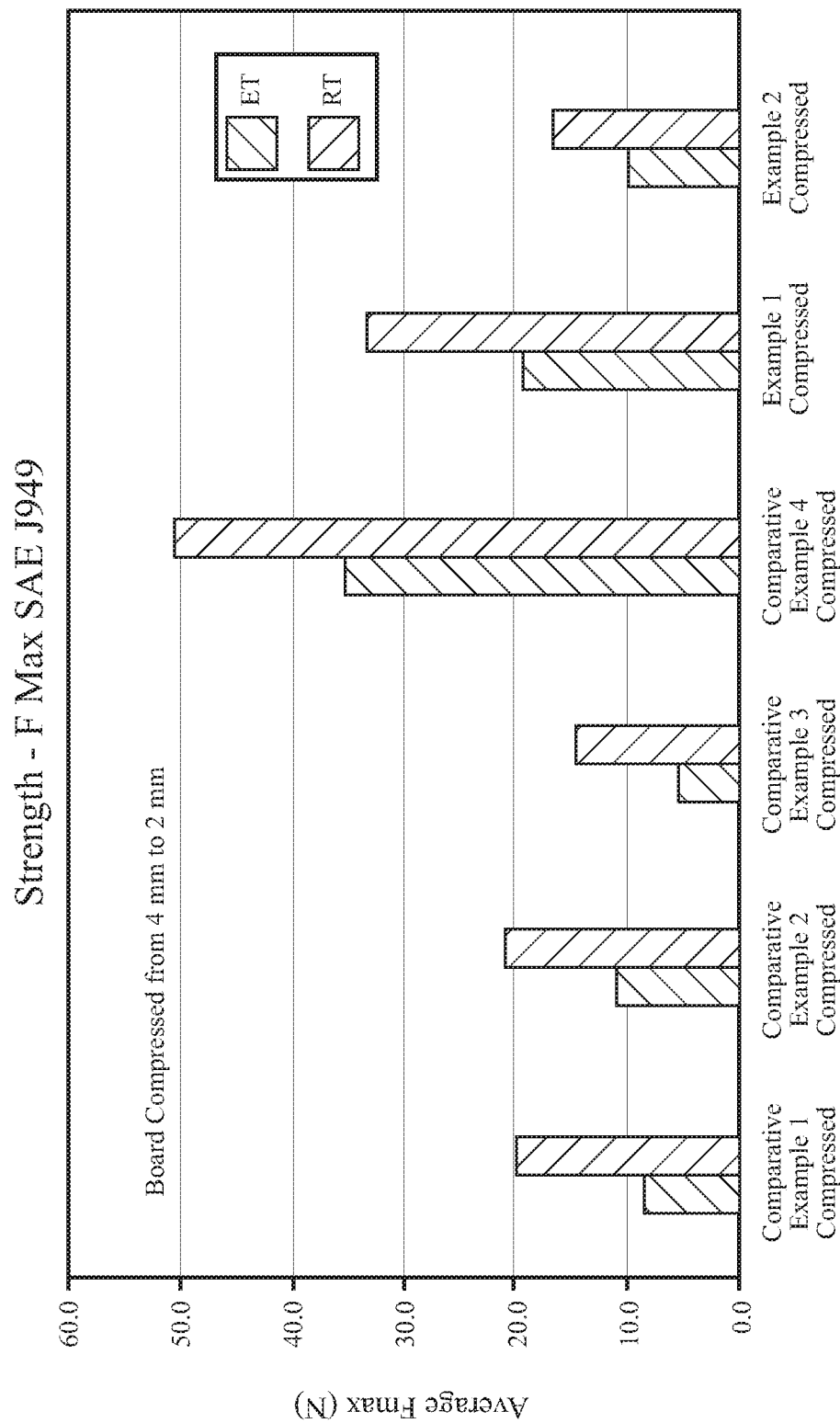
FIG. 9 is a graph illustrating the strength of the composite foam article and various comparative foam articles tested in accordance with SAE J949 at a thickness of about 2 mm.
Figure 10:
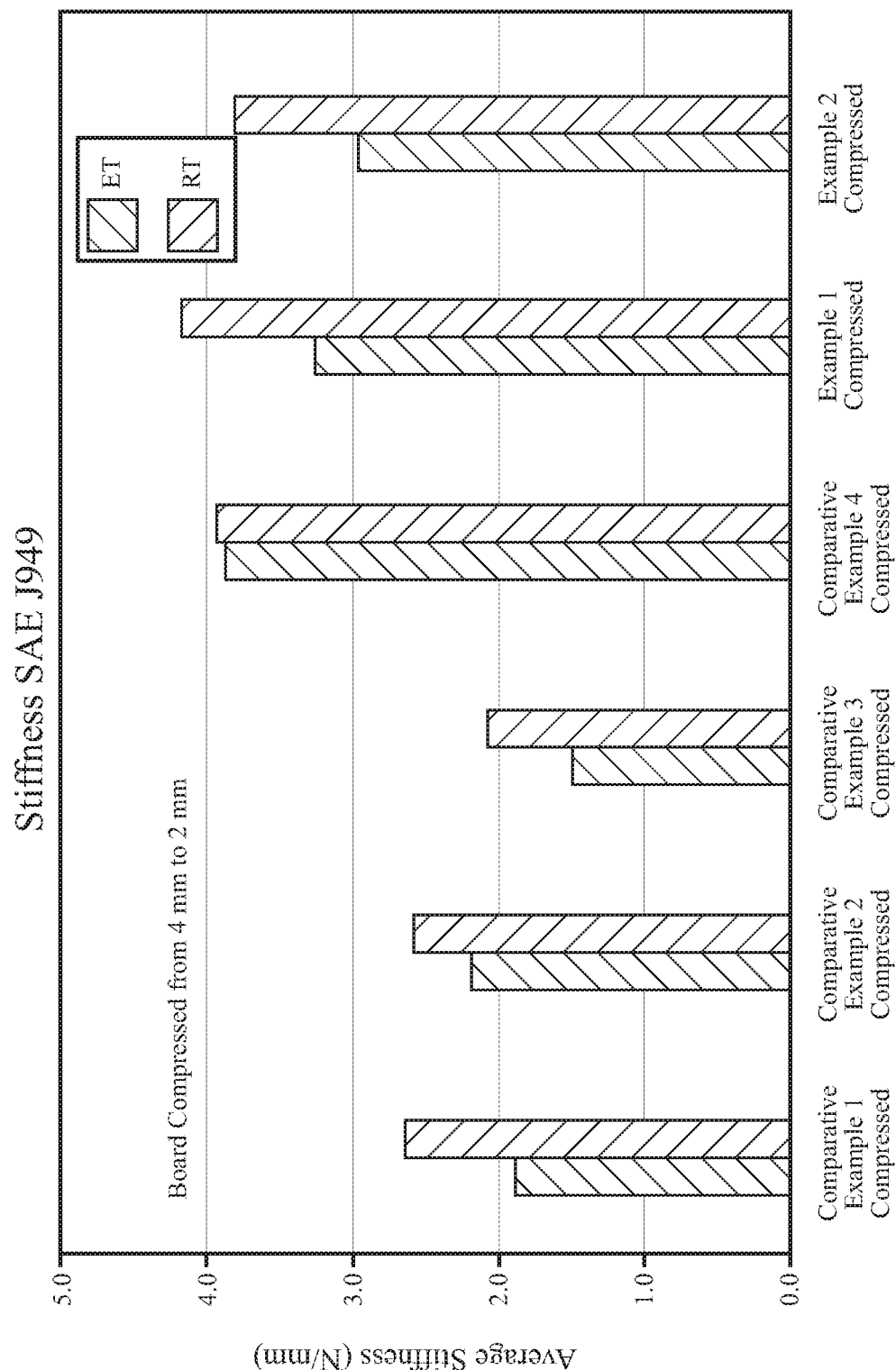
FIG. 10 is a graph illustrating the stiffness of the composite foam article and various comparative foam articles tested in accordance with SAE J949 at a thickness of about 2 mm.

Referring now to FIG. 2, in some embodiments, the composite foam article 10 includes the first skin 18 disposed on the first surface 14, and the second skin 20 disposed on the second surface 16. In most embodiments, the first and/or the second skin 18, 20 is in the form of a porous material layer such as a layer of chopped fiberglass, a veil, a mat, or the like. Although a porous layer is not specifically illustrated in the drawings, e.g. in FIG. 2, it should be appreciated that the first and/or the second skins 18, 20 are represented as a single layer although they comprise multiple components arranged in a porous configuration. That is, in the drawings, the first and second skins 18, 20 include a plurality of fibers and a polymeric binder, which are represented by two sub layers one of which is meant to represent the plurality of fibers, and the other meant to represent the polymeric binder. It should be appreciated that the plurality of fibers and the polymeric binder combine to form each skin

18, 20. The first and second skins 18, 20 can include like or different components (e.g. fibers, binder, etc.) and can be included in the composite foam article 10 in like or different amounts (e.g. different weight per unit area, or different thicknesses).

It should be appreciated that FIGS. 2, 11, 12, and 13 are not drawn to scale and are for illustrative purposes. To this point, an additional or supplemental polymeric layers 24 would typically be thinner than a first or second skin 18, 20, but this difference is not depicted in the Figures as such.

The plurality of fibers may be alternatively described as the fibers or the fiber. The plurality of fibers may be woven, non-woven, or any other suitable construction. The plurality of fibers can be naturally occurring or synthetic. The plurality of fibers may include various combinations of the types of fibers set forth.

In various embodiments, the plurality of fibers are, include, comprise, consist essentially of, or consist of, a material selected from polymers, ceramic, glass, metal, mineral, and carbon. In various embodiments, the fibers are, include, comprise, consist essentially of, or consist of: aramid fibers, carbon fibers, cellulose fibers (including kenaf and hemp), acrylic fibers, polyvinyl alcohol fibers, glass fibers, mineral fibers, metal fibers, and combinations thereof.

In some embodiments, the plurality of fibers comprise a polymer. That is, the plurality of fibers comprise, consist essentially of, or consist of, a polymer.

For example, in some such embodiments, the plurality of fibers include aramid or aromatic polyamide. In many embodiments, the fibers, include, comprise, consist essentially of, or consist of, aromatic polyamide, i.e., aramid. Aramid fibers are a class of heat-resistant and strong synthetic fibers. In some embodiments, the aromatic polyamide is a meta-aramid fiber. In other embodiments, the aromatic polyamide is a para-aramid. The aramid fibers may be pulp or flock of various lengths and diameters.

Aramids are typically formed by reacting amines and carboxylic acid halides. In one embodiment, the aramid is further defined as having at least about 85 percent of amide linkages (—CO—NH—) attached directly to two aromatic rings. In some embodiments, additives can be used with the aramid, and it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. To this end, the aramid fibers contemplated and disclosed herein also include aramid copolymers, e.g. polymers including amide and other linkages. In some embodiments, the aromatic polyamide is selected from the group of poly-paraphenylene terephthalamide, poly-meta-phenylene isophthalamide, polyether-polyurea copolymer (elastane), and mixtures thereof.

In some embodiments, the plurality of fibers comprise polyester. For example, a terephthalic acid based polyester. Non-limiting examples of terephthalic acid based polyester include poly(ethylene terephthalate) (PET), polybutylene terephthalate (PBT), Polytrimethylene terephthalate (PTT), and Polyethylene naphthalate (PEN). In other embodiments, the plurality fibers comprise a poly(aromatic ester) selected from the group of poly-paraphenylene terephthalamide, poly-meta-phenylene isophthalamide, polyether-polyurea copolymer (elastane), and mixtures thereof.

In other embodiments, the plurality of fibers comprise mineral or glass. That is, the plurality of fibers comprise, consist essentially of, or consist of a glass. In such embodiments, the plurality of fibers can comprise a glass type selected from at least one of E-glass (alumina-calcium-borosilicate), S2 glass (magnesium-alumino-silicate), C glass (calcium borosilicate), and R glass. In some embodiments, the plurality of fibers can comprise a mineral type selected from at least one of silica, basalt, and quartz.

All weight ranges and ratios of the various combinations of the aforementioned fiber types are hereby expressly contemplated in various non-limiting embodiments.

In a typical embodiment including the first and second skins 18, 20, each of the skins 18, 20 comprise a single, porous layer. Alternatively, each of the skins 18, 20 can comprise a plurality of porous layers. In such embodiments, it is possible to use from 2 to 15 porous layers, from 2 to 12 porous layers, from 2 to 10 porous layers, from 2 to 8 porous layers, or from 4 to 8 porous layers.

The first and the second skins 18, 20 also comprise a polymeric binder. In various embodiments, the binder is, includes, comprises, consists essentially of, or consists of, a polymer. The polymeric binder may include various combinations of the types of polymers set forth. Some non-limiting examples of polymers include epoxies, polyurethanes, polyureas, phenolics, polyacrylates, silicones, polysulfides, polyolefins, polyesters, nylons, polyvinylchlorides, latex, styrene-butadiene polymers, nitrile-butadiene polymers, mixtures thereof, copolymers thereof and interpenetrating networks thereof. In some embodiments, the polymeric binder comprises a polymer selected from polyethylene and polypropylene.

As alluded to above, the composite foam article 10 may include one or more additional or supplemental polymeric layers 24 different than the polymeric binder. If included, the additional or supplemental polymeric layers 24 can be included in the composite as or formed from a powder, scrim, or film. Such layers can be disposed on the first and/or second surface 14, 16 of the polyurethane foam core 12 to improve adhesion of the skin 18, 20 to the polyurethane foam core 12. Alternatively, in some embodiments, the additional or supplemental layers 24 can be incorporated into the skin 18, 20 and/or disposed on the skin 18, 20.

Of course, the one or more additional polymeric layers 24 comprise a polymer. In some embodiments, the polymer is a thermoplastic. In other embodiments, the polymer is a thermoplastic elastomer. In other embodiments, the polymer is an elastomer. In some embodiments, the polymer is a thermoset comprising epoxy, polyurethane, polyurea, phenolic, acrylate, arylate, silicone, polysulfide, polyester, and mixtures thereof. Various non-limiting examples of polymers which can be used include polyolefins, polyesters, nylons, poly(vinyl chloride), polyurethanes, polyacrylates, latex, styrene-butadiene polymers, nitrile-butadiene polymers, silicone polymers, polyisobutylene, mixtures thereof, copolymers thereof and interpenetrating networks thereof.

In some preferred embodiments, the one or more additional polymeric layers 24 comprise a polyolefin.

In some preferred embodiments, the one or more additional polymeric layers 24 comprise polyethylene, polyethylene terephthalate, ethylene and acrylic acid copolymer ("EAA copolymer"), polyethylene, polypropylene, and combinations thereof.

In some such embodiments, the at least one additional layer 24 (e.g. comprising EAA copolymer) is utilized in an amount from about 8 to about 30, from about 10 to about 20, or from about 10 to about 15 (e.g. 13), g/m$^2$. In various non-limiting embodiments, all values and ranges of values including and between those described above are hereby expressly contemplated for use herein.

Further, in some embodiments, the at least one additional layer 24 (e.g. comprising EAA copolymer) is utilized as a film having a tensile elongation of from about 200 to about 400% MD and from about 350 to about 550% TD when tested in accordance with ASTM D882. In various non-limiting embodiments, all values and ranges of values including and between those described above are hereby expressly contemplated for use herein.

Figure 11:
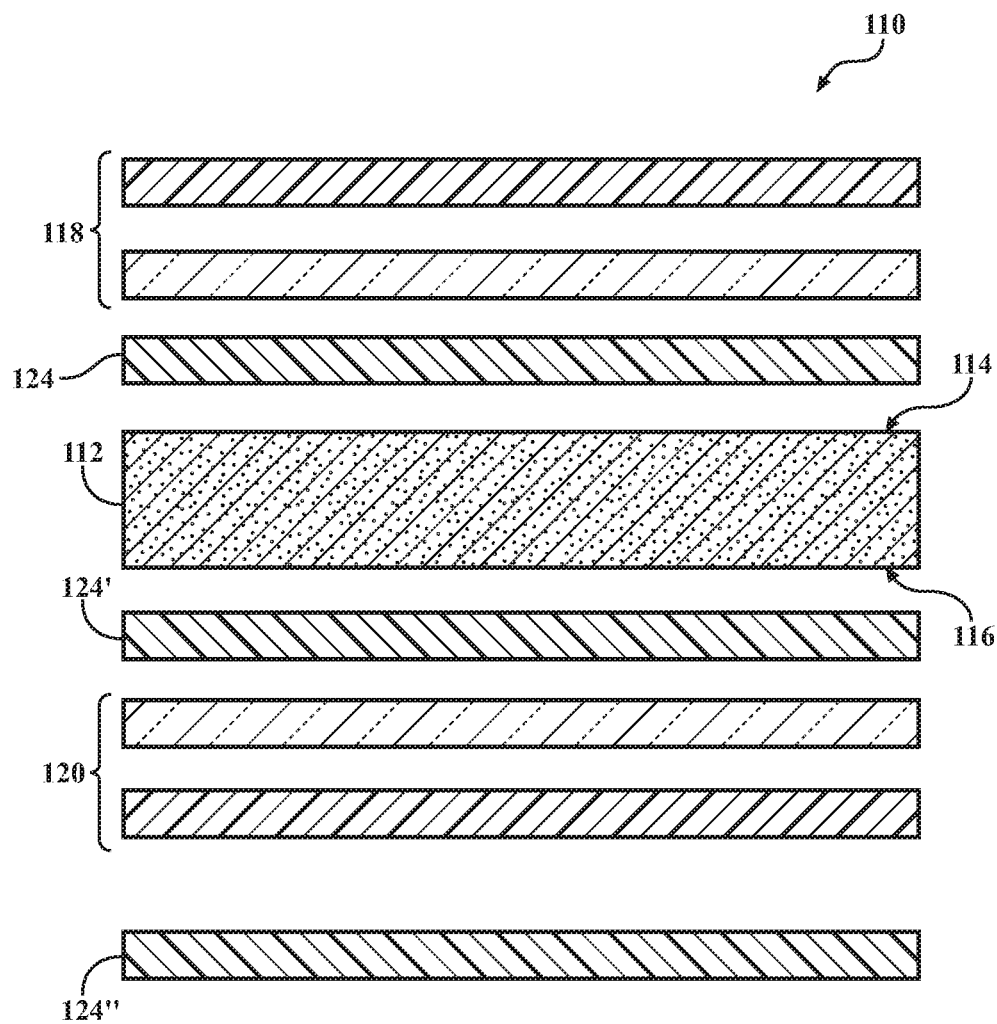
FIG. 11 is another expanded cross-sectional view of an embodiment of the composite foam article of this disclosure which can be used as an automotive headliner substrate.
Figure 12:
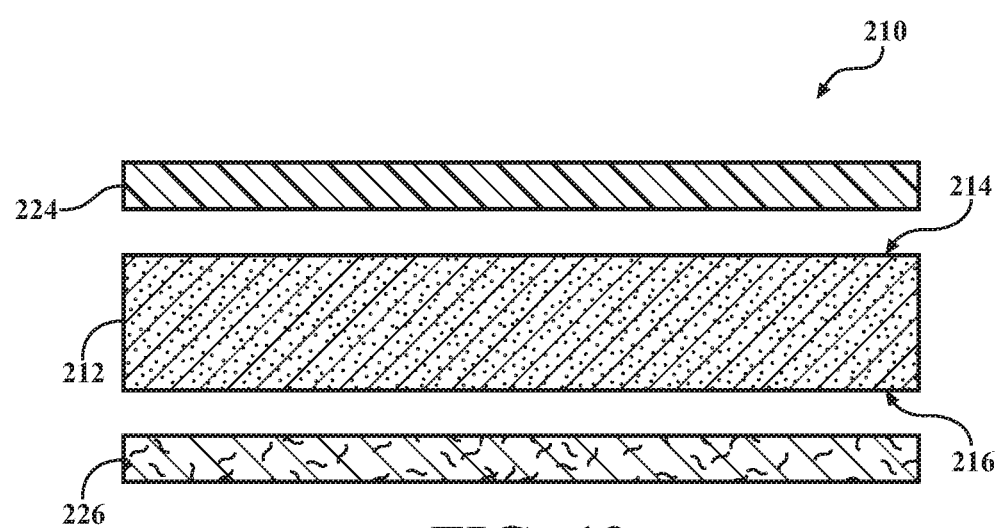
FIG. 12 is an exploded cross-sectional view of an embodiment of the composite foam article of this disclosure which can be used as an automotive headliner coverstock.

In some embodiments, the additional polymeric layer(s) 24 comprises EAA copolymer and is formed from film or powder disposed on the first and/or second surface 14, 16 of the polyurethane foam core 12 to improve adhesion of the skins 18, 20 to the polyurethane foam core 12. Alternatively the additional or supplemental layers 24 can be incorporated into the skin 18, 20 and/or disposed on the skin 18, 20. When EAA copolymer is utilized, it offers excellent adhesion to the polyurethane foam core 12. FIGS. 11 and 12, which are described in detail below, are an exploded view of the various layers of the composite foam article 110, 210 which utilizes supplemental layer(s) 124, 124', 224 comprising EAA copolymer.

In some embodiments, the additional or supplemental layers 24 comprising EAA copolymer are formed from a single layered EAA copolymer film. In other embodiments, the additional or supplemental layers 24 comprising EAA copolymer are formed from a multi-layered EAA copolymer film. The supplemental layers 24 of such film embodiments can be the same or different. In some examples, the film utilizes multiple layers of EAA copolymer film. In other examples, the film comprises one or more layers including a first polymer (e.g. EAA copolymer) and one or more layers comprising a second polymer (e.g. polyethylene).

For example, in some embodiments, the additional or supplemental layer(s) 24 comprises EAA copolymer, and is formed from multiple sub-layers comprising different polymer types. In some particular examples, the supplemental layer 24 includes a first sub-layer comprising EAA copolymer, a second sub-layer comprising polyethylene or polypropylene, and a third sub-layer comprising polyethylene or polypropylene (e.g. in a configuration wherein the second sub-layer is disposed between the first and the third sub-layers. In many preferred embodiments, the first sub-layer comprising EAA copolymer is corona treated.

That is, a surface of the additional or supplemental layer(s) 24 can be corona treated. When the additional or supplemental layer(s) 24 is used to promote adhesion of the various layers of the composite foam article 10, to the surface of the polyurethane foam core 12. The corona treated surface is of the additional or supplemental layer(s) 24 abuts the first or the second surface 14, 16 of the polyurethane foam core 12. For example, in some embodiments, where the supplemental layer 24 is utilized to improve the adhesion of the various layers of the composite foam article 10 to the polyurethane foam core 12, the supplemental layer 24 includes a corona treated first sub-layer comprising EAA copolymer, a second sub-layer comprising polyethylene or polypropylene, and a third sub-layer comprising polyethylene or polypropylene and the composite foam article 10 is formed (e.g. laminated) with the corona treated first sub-layer comprising EAA copolymer facing the polyurethane foam core 12. In one particular embodiment, the supplemental layer 24 includes a corona treated first sub-layer comprising EAA copolymer, a second sub-layer comprising polyethylene, and a third sub-layer comprising polyethylene.

In some non-limiting examples, the supplemental layer 24 including a first sub-layer comprising EAA copolymer, a second sub-layer comprising polyethylene or polypropylene, and a third sub-layer comprising polyethylene or polypropylene is utilized in a headliner substrate, a headliner cover, a seat cover, etc. In such embodiments, the supplemental layer(s) 24 including a first sub-layer comprising EAA copolymer, a second sub-layer comprising polyethylene or polypropylene, and a third sub-layer comprising polyethylene or polypropylene is typically disposed on the first and/or or second surface 14, 16 of the polyurethane foam core 12 with the EAA copolymer facing the first and/or or second surface 14, 16 of the polyurethane foam core 12.

In other such embodiments, the at least one additional layer 24 (e.g. comprising EAA copolymer) is utilized as a film at a thickness of from about 5 to about 50, from about 10 to about 30, from about 12 to about 25, or from about 13 to about 25 (e.g. about 15, 16, 17, 18, or 19), μm. In various non-limiting embodiments, all values and ranges of values including and between those described above are hereby expressly contemplated for use herein.

In some embodiments, where the additional layer(s) 24 comprises multiple sub-layers, a thicker second sub-layer (e.g. having a thickness of at least twice the thickness of a first sub-layer, and, if included, a third sub-layer) is utilized. As a non-limiting example, the additional layer(s) 24 can comprise a first sub-layer layer (e.g. comprising EAA copolymer) and having a thickness of from about 2 to about 4.5, μm, a second (or central) sub-layer having a thickness of from about 8 to about 14, μm, and a third sub-layer having a thickness of from about 2 to about 4.5, μm. As another non-limiting example, the additional layer(s) 24 can comprise a first sub-layer layer (e.g. comprising EAA copolymer) and having a thickness of from about 2 to about 4, μm, a second sub-layer having a thickness of from about 8 to about 14, μm.

Further, in some embodiments, the at least one additional layer 24 (e.g. comprising EAA copolymer) is utilized as a film having an Elmdorf tear strength of from about 15 to about 35 g MD and from about 200 to about 540 g TD when tested in accordance with ASTM D1922. In various non-limiting embodiments, all values and ranges of values including and between those described above are hereby expressly contemplated for use herein.

The composite foam article 10 may optionally include one or more catch layers. The one or more catch layers "catch" VOCs, i.e., and reduce VOC emissions from the composite foam article 10 and absorb VOCs from within the passenger compartment to improve air quality in the passenger compartment. The one or more catch layers can be dispersed in and/or disposed between any of the aforementioned layers.

The catch layer includes particles of carbon having a surface area of greater than about 300 m$^2$/g. Such high surface area carbon is often referred to as activated carbon, active carbon, or activated charcoal. The particles of carbon have small, low-volume pores that increase the surface area available for adsorption and/or chemical reactions.

Due to its high degree of microporosity, one gram of activated carbon can have a surface area in excess of 3,000 m$^2$/ft. Typically, the surface area of the particles of carbon is determined by gas adsorption. The particles of carbon absorb VOCs as a function of high surface area. However, in some embodiments, the particles of carbon can be chemically treated to further enhance its adsorption properties. In some embodiments, the particles of carbon have a surface area of greater than about 300, greater than about 600, greater than about 900, greater than about 1,200, greater than about 1,500, greater than about 1,800, greater than about 2,100, greater than about 2,400, greater than about 2,700, or greater than about 3,000, m²/g. Alternatively, in some embodiments, the particles of carbon have a surface area of from about 500 to about 5,000, from about 600 to about 4,500, from about 600 to about 3,500, or from about 700 to about 2,500, m²/g. In various non-limiting embodiments, all values and ranges of values including and between those described above are hereby expressly contemplated for use herein.

If included, the particles of carbon are typically included in the composite foam article 10 in the form of particles or powder, as opposed to in sheet form or some other form. In some embodiments, the particles of carbon have a mean particle size of from about 5 to about 1,000, from about 5 to about 100, from about 5 to about 60, from about 5 to about 35, from about 8 to about 32, or from about 10 to about 60, μm. The mean particle size is the mean particle diameter which is calculated as the size, expressed in μm, for which 50% by weight of granules are smaller. In various non-limiting embodiments, all values and ranges of values including and between those described above are hereby expressly contemplated for use herein.

In some embodiments, the particles of carbon are made from a raw material chosen from at least one of coconut shell, coal, and wood. In one particular embodiment, the particles of carbon are made from coconut shell. Various types of the particles of carbon are commercially available from: Jacobi Carbons, Inc. of Columbus, Ohio, under the tradename ADDSORB™; from Liberty Carbon Service Inc. of Excelsior Springs, Mo.; or from Calgon Carbon Corporation of Pittsburgh, Pa.

In addition to particles of carbon, the catch layer may include various other absorbents, antioxidants, fillers, and other additives. For example, in some embodiments, the catch layer further comprises a zeolite. Zeolites are microporous, aluminosilicate minerals. In one particular embodiment, the catch layer includes particles of carbon and a zeolite.

In some embodiments, the catch layer comprises carbon in an amount of from about 2 to about 200, from about 2 to about 50, from about 5 to about 50, or from about 10 to about 40, g/m². In various non-limiting embodiments, all values and ranges of values including and between those described above are hereby expressly contemplated for use herein.

It should be appreciated that the composite foam article 10 can include additional layers in various configurations. For example, the composite foam article 10 typically comprises a finished outer layer that faces the passenger compartment which is disposed adjacent the first skin 18.

In addition to use as a headliner substrate, examples of the composite foam article 10 described above can be used as seat backs, package trays, and load floors with the same or a different combination of layers.

In many embodiments, the composite foam article 10 has a pre-compression thickness of from about 2 to about 5 mm, and a post-compression thickness of greater than about 1.5 mm, greater than about 2 mm, from about 1.5 to about 5, or about 2 to about 4.5 mm Pre-compression and post compression thicknesses a described further below with respect to the method of forming (e.g. laminating) the composite foam article 10.

In many embodiments, the composite foam article 10 is porous, and its porosity provides enhanced acoustic properties while its structure provides enhanced strength. In various embodiments, the composite foam article 10 has an air flow resistance of greater than about 250, greater than about 500, greater than about 750, from about 500 to about 7,500, or from about 500 to about 5,000, mks rayls (Pas/m) when tested in accordance with ASTM C522-03. ASTM C522-03 covers the measurement of airflow resistance and the related measurements of specific airflow resistance and airflow resistivity of porous materials that can be used for the absorption and attenuation of sound. ASTM C522-03 is designed for the measurement of values of specific airflow resistance ranging from 100 to 10,000 mks rayls (Pas/m).

In many embodiments, the composite foam article 10 has a weight per unit area of from about 500 to about 1,200, from about 750 to about 1,200, from about 750 to about 1,000, from about 800 to about 1,200, from about 800 to about 1,000, or about 700 to about 1,000, g/m². The first and second skin 18, 20 cumulatively contribute from about 25 to about 60, or from about 30 to about 55, % of the total weight per unit area of the composite foam article 10. In various non-limiting embodiments, all values and ranges of values including and between those described above are hereby expressly contemplated for use herein.

In many embodiments, the composite foam article 10 has a post-compression stiffness of greater than about 8, greater than about 9, greater than about 10, greater than about 12, greater than about 14, from about 10 to about 25, from about 12 to about 25, or from about 14 to about 25, N/mm at a post compression thickness of about 4, mm when tested in accordance with SAE J949 at room temperature (about 23° C.) and/or at elevated temperature (about 80° C.). In various non-limiting embodiments, all values and ranges of values including and between those described above are hereby expressly contemplated for use herein.

In some embodiments, the composite foam article 10 has a post-compression stiffness of greater than about 3 N/mm, greater than about 3.5 N/mm, or from about 3 N/mm to about 12 N/mm, and a post compression thickness of about 2 mm when tested in accordance with SAE J949 at room temperature (about 23° C.) and/or at elevated temperature (about 80° C.). In various non-limiting embodiments, all values and ranges of values including and between those described above are hereby expressly contemplated for use herein.

In many embodiments, the composite foam article 10 has a strength of greater than about 10, greater than about 11, greater than about 12, greater than about 13, greater than about 14, greater than about 15, greater than about 16, greater than about 17, greater than about 18, greater than about 19, greater than about 20, greater than about 21, greater than about 22, greater than about 25, greater than about 30, greater than about 35, greater than about 40, greater than about 45, or greater than about 50, N at a post-compression thickness of greater than about 2, from about 2 to about 5, from about 2 to about 4, about 2 mm, or about 4 mm, when tested in accordance with SAE J949 at room temperature (about 23° C.) and/or at elevated temperature (about 80° C.). In various non-limiting embodiments, all values and ranges of values including and between those described above are hereby expressly contemplated for use herein.

A method of forming (e.g. laminating) some embodiments of the composite foam article 10 is also disclosed. Notwithstanding the "dry" method or process disclosed below, it should be appreciated that the composite foam article 10 of the subject disclosure formed with "wet" and other processes, which are also known in the art, are contemplated herein as well.

In one embodiment, the method includes the steps of:
positioning a blank in a heating device, the blank comprising:

the polyurethane foam core 12 (as is described above) presenting a first surface 14 and a second surface 16 facing opposite the first surface 14, the polyurethane foam core 12 having: pre-compression thickness of from about 2 to about 5, or from about 3 to about 5 mm; and a density of from about 45 to about 80 kg/m³;

the first skin 18 (as is described above) disposed on the first surface 14; and a second skin 20 (as is described above) disposed on the second surface 16;

heating the laminated blank at a temperature above the melting point of the polymeric binder to cause the polymer to melt and the layers of the composite foam article 10 to adhere to one another; and compressing the laminated blank to form the composite foam article 10 having a strength of greater than 17 N at a post-compression thickness of greater than about 2 mm when tested in accordance with SAE J949 at ambient temperature (about 23° C.).

In a typical embodiment, the step of positioning a blank in a heating device is further described as laminating a blank at a temperature of from about 150 to about 250, or from about 170 to about 230, ° C. In a typical embodiment, the step of laminating can be described as including the sub-step of surface heating the blank (conductive heating). In some embodiments, the step of positioning a blank in a heating device can be described as laminating a headliner substrate.

In a typical embodiment, the method also includes the step of molding the laminated blank into a pre-determined shape (thermoforming). Typically, the step of heating the laminated blank and molding the laminated blank are conducted sequentially.

In a typical embodiment, the laminated blank is then subjected to a temperature of at least about 150° C. in an oven and then transferred to a forming tool at ambient temperatures (about 23° C.) for a period of time sufficient to cause the layers to form a shape, e.g. a contoured headliner shell shape, as defined in the forming tool. In this molding or thermoforming step, the finished outer layer (e.g. facing materials such as knitted fabrics pre-bonded to a thin layer of flexible foam or non-woven scrims) can be introduced. In the example of headliners, the finished outer layer (headliner coverstock) becomes the "A" surface of the contoured headliner shell with the laminated blank serving as a contoured structural core (e.g. headliner substrate). In some embodiments, the steps of heating the laminated blank, compressing the laminated blank, and molding the laminated blank can be described as molding a headliner.

In many embodiments, the heating step in the thermoforming operation is conducted at a temperature of at least about 120, from about 120 to about 250, or from about 150 to about 220, ° C. In various non-limiting embodiments, all values and ranges of values including and between those described above are hereby expressly contemplated for use herein.

Many of the method steps described herein are included in U.S. Patent Application Publication No. 2008/0311336, which is incorporated herein in its entirety.

Referring now to FIG. 2, an exploded cross-sectional view of one embodiment of the composite foam article 10 which can be utilized as a headliner substrate is illustrated. The polyurethane foam core 12 comprises a semi-rigid polyurethane foam and presents the first surface 14 and the second surface 16 facing opposite the first surface 14. The first skin 18 is disposed on the first surface 14 and the second skin 20 is disposed on the second surface 16. The first and second skins 18, 20 comprise a plurality of glass fibers and a polymeric (e.g. polypropylene) binder. Those of skill in the art understand that the layers of the embodiments of the composite foam article 10 in FIG. 1 and described elsewhere herein intermingle as a result of the lamination process such that there may be a gradual interface between the layers as a result of the melting of the polymeric materials in the composite foam article 10 and the subsequent lamination and molding of the layers. Further, the embodiment of FIG. 2 includes three additional polymeric layers 24, 24', and 24". In some embodiments, additional polymeric layers 24, 24' can comprise high density polyethylene while 24" can comprise poly(ethylene terephthalate) scrim. Of course, FIG. 2 does not include a headliner coverstock fabric/flexible foam or non-woven facing material, which would typically be applied to this composite foam article 10 in the thermoforming step to produce an automotive headliner.

Referring now to FIG. 11, an exploded cross-sectional view of another embodiment of the composite foam article 110 which can be utilized as a headliner substrate is illustrated. The polyurethane foam core 112 comprises a semi-rigid polyurethane foam and presents the first surface 114 and the second surface 116 facing opposite the first surface 114. The first skin 118 is disposed on the first surface 114 and the second skin 120 is disposed on the second surface 116. The first and second skins 118, 120 comprise a plurality of glass fibers and a polypropylene polymeric binder. Those of skill in the art understand that the layers of the embodiments of the composite foam articles 110 in FIG. 11 and described elsewhere herein intermingle as a result of the lamination process such that there may be a gradual interface between the layers as a result of the melting of the polymeric materials in the composite foam article 110 and the subsequent lamination and molding of the layers.

Further, the embodiment of FIG. 11 includes three additional polymeric layers 124, 124', and 124". In contrast to the example of FIG. 2, which includes additional layers 24, 24' comprising high density polyethylene, FIG. 11 includes additional layers 124, 124' comprising EAA copolymer. In some embodiments, like in FIG. 2, additional layer 124" of FIG. 11 can comprise poly(ethylene terephthalate) scrim. Of course, FIG. 11 does not include a headliner coverstock fabric/flexible foam or non-woven facing material, which would typically be applied to this composite foam article 110 in the thermoforming step to produce an automotive headliner.

However, referring now to FIG. 12, the composite foam article 210 can be used as a headliner coverstock. In some such embodiments, the headliner coverstock comprises EAA copolymer. The composite foam article 210 includes polyurethane foam core 212 presenting the first surface 214 and the second surface 216 facing opposite the first surface 214. Further, at least one additional layer 224 comprising an EAA copolymer is disposed on said first surface 214, and a non-woven, woven, leather, or vinyl layer 226 is disposed on said second surface 216. Optionally, a second additional polymeric layer, e.g. comprising EAA copolymer, can be included between the polyurethane foam core 212 and a non-woven, woven, leather, or vinyl cover layer 226 which is disposed on said second surface 216.

Referring now to FIG. 12, FIG. 12 provides an expanded cross-sectional view of one embodiment of the composite foam article 210 which can be utilized as a headliner coverstock. In the embodiment of FIG. 12, the composite foam article 210 (e.g. headliner coverstock) includes the polyurethane foam core 212 comprising a flexible and/or a viscoelastic polyurethane foam and presents the first surface 214 and the second surface 216 facing opposite the first surface 214. An additional layer 224 comprising an EAA copolymer is disposed on the first surface 214, and the cover layer 226 (non-woven, woven, leather, or vinyl) is disposed on the second surface 216.

Figure 13:
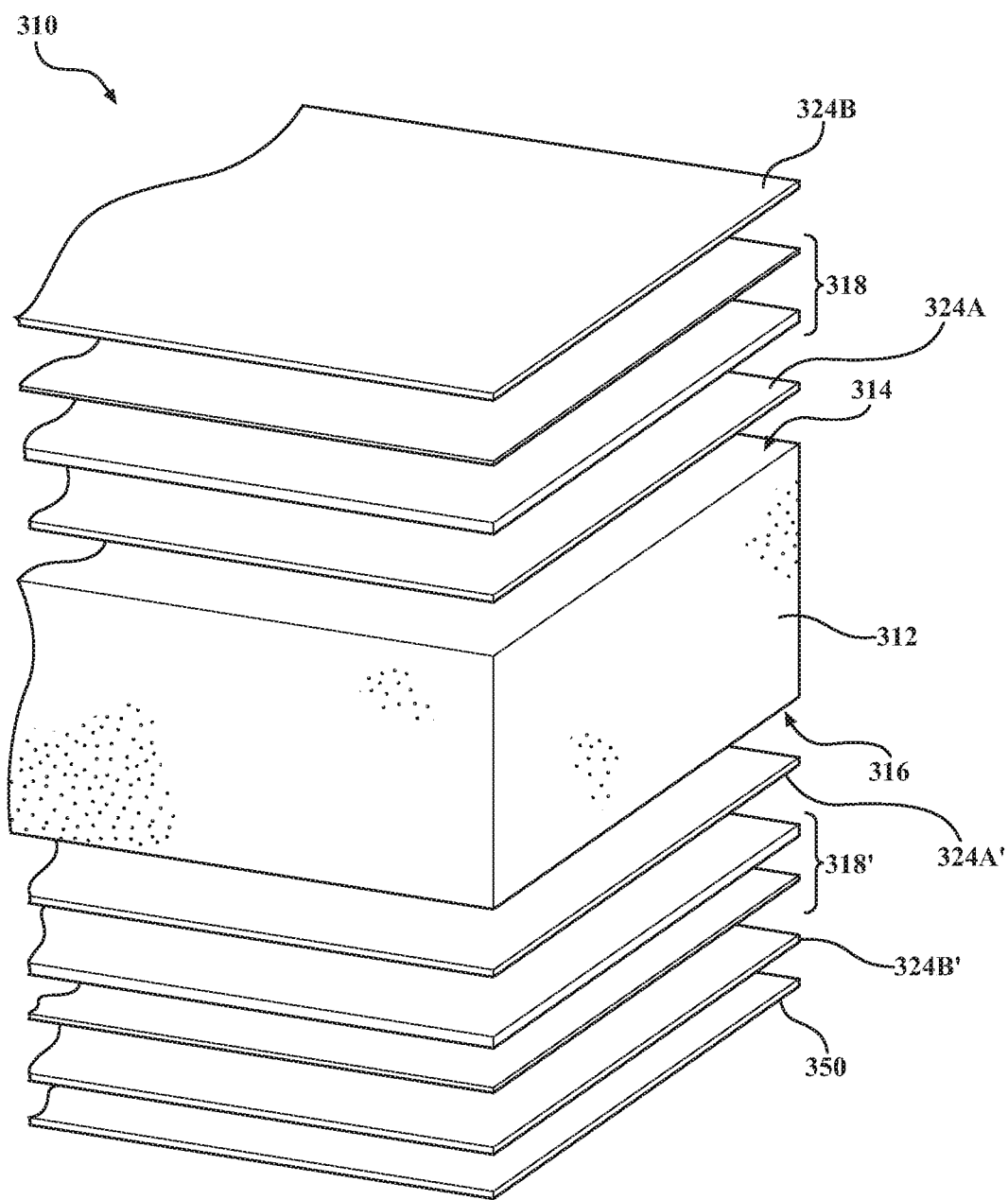
FIG. 13 is an exploded perspective view of the composite foam articles of Examples 3-6.

Referring now to FIG. 13, an exploded cross-sectional view of another embodiment of the composite foam article 310 which can be utilized as a headliner substrate is illustrated. the composite foam article 310 of FIG. 13, includes a polyurethane foam core 312, first and second skins 318, 318' comprising fiberglass and polypropylene thereon, as well as two additional layers 324A, 324A' comprising first and second additional layers comprising EAA copolymer film disposed between the first and second skins 318, 318' and the surfaces 314, 316 of the polyurethane foam core 312. Two more additional layers 324B, 324B' comprising polypropylene are included along with a backing scrim (e.g. comprising PET) 350. It is to be appreciated that the polyurethane foam core 312, first and second skins 318, 318' and additional layers 324A, 324A', 324B, and 324B' can comprise the various materials described above with reference to the polyurethane foam core 312, skins 318, 318', and additional layers 324A, 324A', 324B, 324B' described above and all such embodiments are contemplated.

In some embodiments, the composite foam article 10 described herein and including an additional polymeric layer comprising EAA COPOLYMER is used in/is a seat component, e.g. seat trim. Referring again to FIG. 12, the composite foam article 210 illustrated can also be used as a seating component. To this end, the composite foam article 210 may be a seating component and referred to as such. As used throughout this disclosure, the term "seat component" is used in connection with one, some or all of a cushion (i.e., the portion of the seat on which the occupant/passenger sits), a back or back rest (i.e., the portion of the seat which supports the back of the occupant/passenger), and a side bolster (i.e., the extension of the cushion, back or the back rest, which laterally supports the occupant/passenger).

For example, in some embodiments, the composite foam article 210 is a seat component comprising:
the polyurethane foam core 212 presenting the first surface 214 and the second surface 216 facing opposite the first surface 214;
an additional polymeric layer 224 comprising an EAA copolymer is disposed on the first surface 214,
an additional polymeric layer comprising an EAA copolymer (not shown) may be optionally disposed on the first surface 214; and
the cover layer 226 (non-woven, woven, leather, or vinyl) is disposed on the second surface 216.

In many seating embodiments, the composite foam article 10 comprises a flexible and/or a viscoelastic polyurethane foam.

Further, in such seating embodiments, the non-woven, woven, leather, or vinyl layer 24 may be flame bonded to the second surface 16. In such embodiments, the composite foam article 10 has a total thickness of from about 1 to about 10, mm post flame bonding.

It is to be appreciated that the composite foam articles 10 described above can be used in any combination. Various composite foam articles 10 contemplated herein include laminates for use as headliners, load floors, seat components, sun shades, sun visors, rear seat back panels, and package trays comprising various combinations of the layers described.

The following examples are intended to illustrate the present disclosure and are not to be read in any way as limiting to the scope of the present disclosure.

EXAMPLES

Examples of the composite foam article are described in an automotive headliner application below. Generally, the Examples show how various embodiments of the composite foam article of this disclosure provides excellent strength and stiffness at different compressions and thicknesses.

Examples 1 and 2

The composite foam article of the headliner substrate of Example 1 is described in FIG. 2 and Table 1 below. The composite foam article of the headliner substrate of Comparative Example 1 is also described Table 1 below. Both example composite foam articles include a polyurethane foam core with first and second skins comprising fiberglass and polypropylene thereon. In Table 1, Example 1 and Comparative Example 1 are lightly compressed (at 4 mm), and more significantly compressed (from 4 mm to 2 mm), which often occurs in many areas of a formed headliner.

TABLE 1

| | Polyurethane Foam Core | Total Thickness (mm) | Total Weight/Unit Area (g/m$^2$) |
|---|---|---|---|
| Comparative Example 1 | Semi-rigid PU Foam Initial density: 40 kg/m$^3$ | 4 | 914 g/m$^2$ |
| Example 1 | Semi-rigid PU Foam Initial density: 69 kg/m$^3$ | 4 | 875 g/m$^2$ |
| Comparative Example 1 compressed | Semi-rigid PU Foam Initial density: 40 kg/m$^3$ | 2 | 914 g/m$^2$ |
| Example 1 compressed | Semi-rigid PU Foam Initial density: 69 kg/m$^3$ | 2 | 875 g/m$^2$ |

Example 1 and Comparative Example 1 are tested at a thickness of about 2 mm and about 4 mm for strength and stiffness in accordance with SAE J949, and the results are set forth in FIGS. 3-6 at room temperature (about 23° C.) and at elevated temperature (about 80° C.).

Referring now to FIGS. 3-6, Example 1 which includes a polyurethane foam core having a density of 69 kg/m$^3$ and includes the first and second skins for a total weight per unit area of 875 g/m$^2$ exhibits significantly higher strength and stiffness than Comparative Example 1 which has a polyurethane foam core with density of 40 kg/m$^3$ and includes the first and second skins for a total weight per unit area of 914 g/m$^2$. As such, Example 1, has a polyurethane foam core with an initial density of 69 kg/m$^3$, and has a weight per unit area of 875 g/m$^2$ exhibits superior strength and stiffness relative to Comparative Example 1 at both 4 mm and 2 mm and also at room temperature (about 23° C.) and at elevated temperature (about 80° C.).

Further, Example 1 exhibits a firm feel to the touch (is less spongy) while Comparative Examples 1 exhibits a softer feel to the touch, e.g. when applying thumb pressure.

Example 1 has a flexible polyurethane foam core, which has a density of 69 kg/m³, 80 psi CFD (at 10% defection) at 23° C., and 30% elongation at forming temperature (200° C.). Surprisingly, the polyurethane foam core of Example 1 imparts the excellent strength and flexibility characteristics set forth in FIGS. 3-6. Differences between the foam core of Example 1 and Comparative Example 1 are set forth in Table 2 below.

TABLE 2

|  | Comparative Example 1 | Example 1 |
|---|---|---|
| Top skin (g/m²) | 372 | 298 |
| Foam-(g/m²; 3.75 mm thick) | 150 | 259 |
| Bottom skin (g/m²) | 392 | 318 |
| Total Article Weight (g/m²) | 914 | 875 |
| Weight % Foam (based on 100 PBW Article) | 16% | 30% |
| Foam Core (polyurethane) | | |
| Density (kg/m³) | 40 | 69 |
| Foam Core CFD-20% 23° C. (PSI) | 30 | 80 |
| Foam Core CFD-20% 165° C. (N) | 27 | 90 |

Table 3 below provides a description of the Examples 1 and 2 and Comparative Examples 1-4.

TABLE 3

| Example/ Comparative Example | Description | Structure | Thickness (mm) |
|---|---|---|---|
| Example 1 | Described Above | Sandwich | 4 |
| Example 1 Compressed | Described Above | Sandwich | 2 |
| Example 2 | Like Example 1, except weight per unit area of 675 g/m². | Sandwich | 4 |
| Example 2 Compressed | Similar to Example 1 compressed, except weight per unit area of 675 g/m². | Sandwich | 2 |
| Comparative Example 1 | Described Above | Sandwich | 4 |
| Comparative Example 1 Compressed | Described Above | Sandwich | 2 |
| Comparative Example 2 | Traditional, lower density PU foam, Less Skin Than Comparative Example 1 | Sandwich | 4 |
| Comparative Example 3 | PP/glass Composite Headliner, weight per unit area of 880 g/m² | Non-Sandwich Composite | 4 |
| Comparative Example 4 | PP/glass Composite Headliner, weight per unit area of 1280 g/m² | Non-Sandwich Composite | 4 |
| Comparative Example 2 Compressed | Traditional, lower density PU foam, Less Skin Than Comparative Example 1 compressed | Sandwich | 2 |
| Comparative Example 3 Compressed | PP/glass Composite Headliner, weight per unit area of 880 g/m² | Non-Sandwich Composite | 2 |
| Comparative Example 4 Compressed | PP/glass Composite Headliner, weight per unit area of 1280 g/m² | Non-Sandwich Composite | 2 |

Referring now to FIGS. 7-10, the strength and stiffness of Examples 1 and 2 are compared to various comparative substrates to illustrate their surprisingly strong performance characteristics.

In view of FIGS. 7-10, the high density, high modulus polyurethane foam core of the (69 kg/m³, 80 psi CFD (at 10% defection) and 23° C., and 30% elongation at forming temperature of 200° C.) and the skins of the Examples described (foam weight % increased to 30 weight % of 100 PBW substrate), dramatic improvements in strength and stiffness performance at lower weight per unit areas are demonstrated.

Examples 3-6

The composite foam article of the headliner substrates of Examples 3-6 and Comparative Examples 5-8 are described in Table 4 below. Examples 3-6 include a polyurethane foam core with first and second skins comprising fiberglass and polypropylene thereon as well as two additional layers comprising EAA copolymer film (13 gsm) disposed between the first and second skins and the surfaces of the polyurethane foam core. Two more additional layers comprising polypropylene are included along with a backing scrim. In contrast to Examples 3-6, Comparative Examples 5-8 utilize two additional layers comprising HDPE film (28 gsm) disposed between the first and second skins and the surfaces of a polyurethane foam core, but from the EAA copolymer layers being replaced, the configuration of layers of Comparative Examples 5-8 is the same as that of Examples 3-6. Please refer further to FIG. 13 for an exploded view of the headliner substrate configuration of Examples 3-6 and comparative Examples 5-8.

TABLE 4

|  | Total Thickness (mm) | Air Permeability (ft³/ft²/min) |
|---|---|---|
| Example 3 | 4 | 25 |
| Example 4 | 6 | 16 |
| Example 5 | 8 | 17 |
| Example 6 | 10 | 17 |
| Comp. Ex. 5 | 4 | 2 |
| Comp. Ex. 6 | 6 | 8 |
| Comp. Ex. 7 | 8 | 8 |
| Comp. Ex. 8 | 10 | 5 |

Referring now to Table 4, Examples 3-6, which include a polyurethane foam core with first and second skins comprising fiberglass and polypropylene thereon as well as two additional layers comprising EAA copolymer film (13 gsm), exhibit excellent airflow relative to Comparative Examples 5-8 which utilize two additional layers comprising HDPE film (28 gsm).

Figure 14:
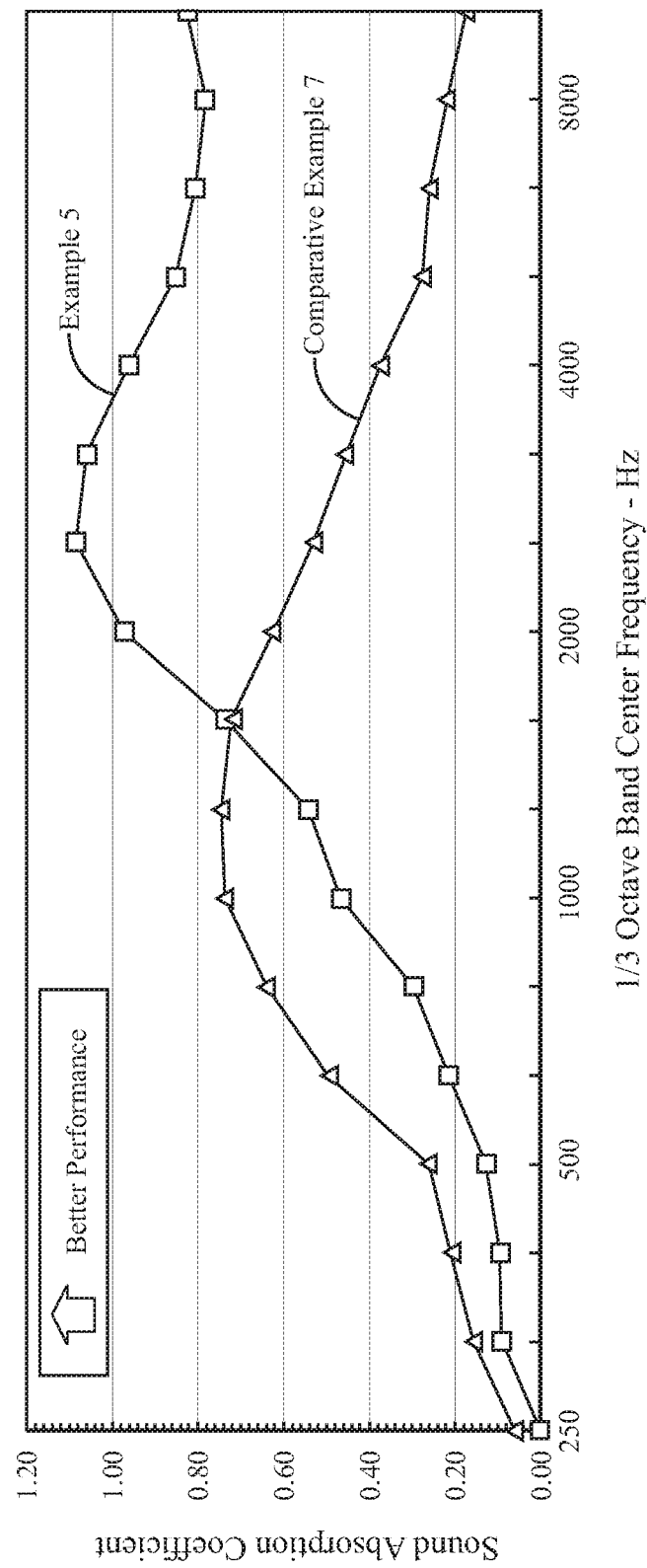
FIG. 14 is a graphical analysis of the sound absorption of Example 6 and Comparative Example 8.

Referring now to FIG. 14, the improved air flow contributes to improved sound absorption at higher frequencies. FIG. 14 is a graphical analysis of the sound absorption of Example 5 and Comparative Example 7. Example 5 exhibits improved sound absorption at higher frequencies, which is desirable in automotive applications.

Figure 15:
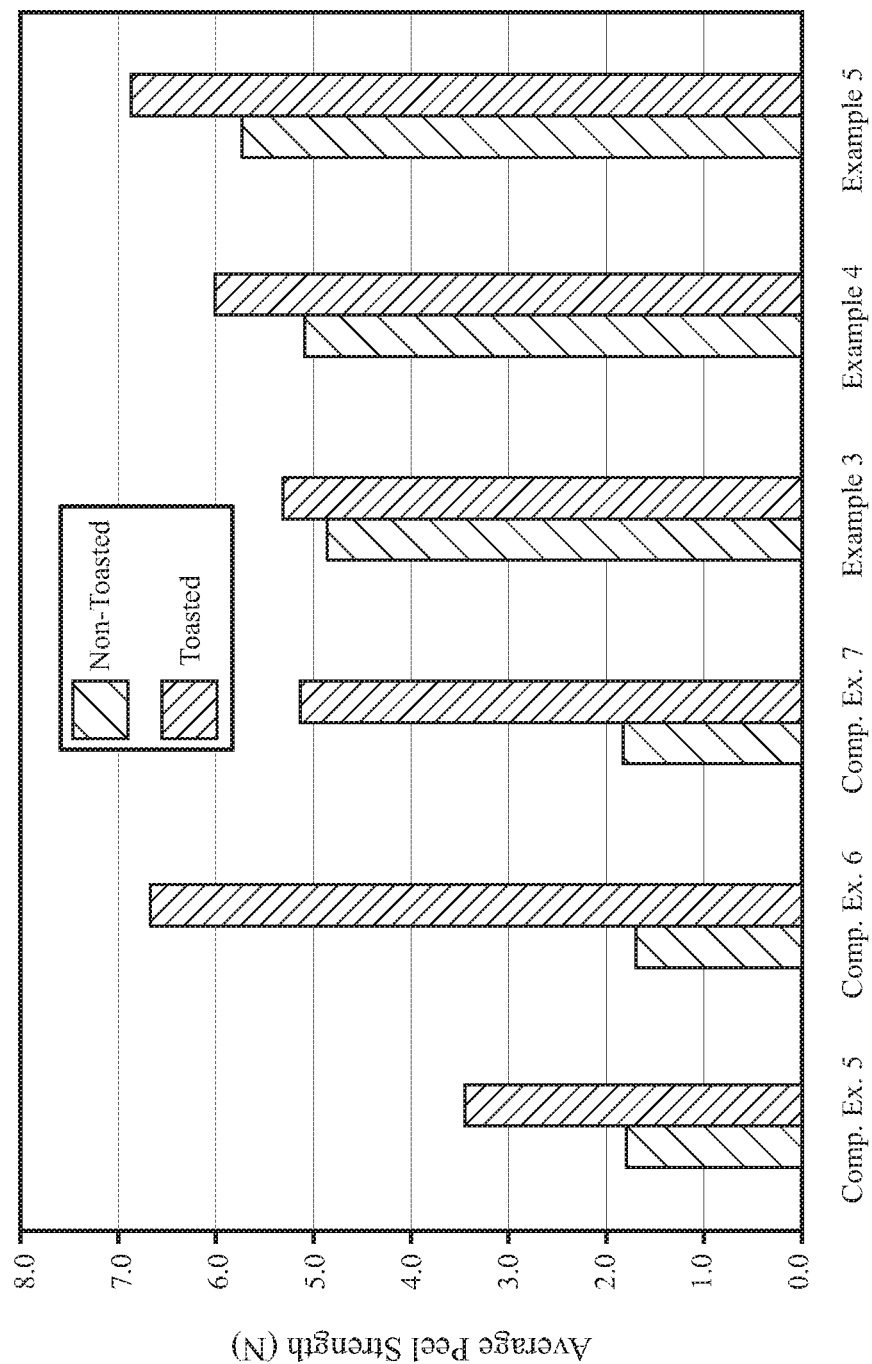
FIG. 15 is a graphical analysis comparing the peel strength between the first skin (on the "A side" of the substrate) and the polyurethane foam core of Examples 3, 4, and 5 and Comparative Examples 5, 6, and 7.
Figure 16:
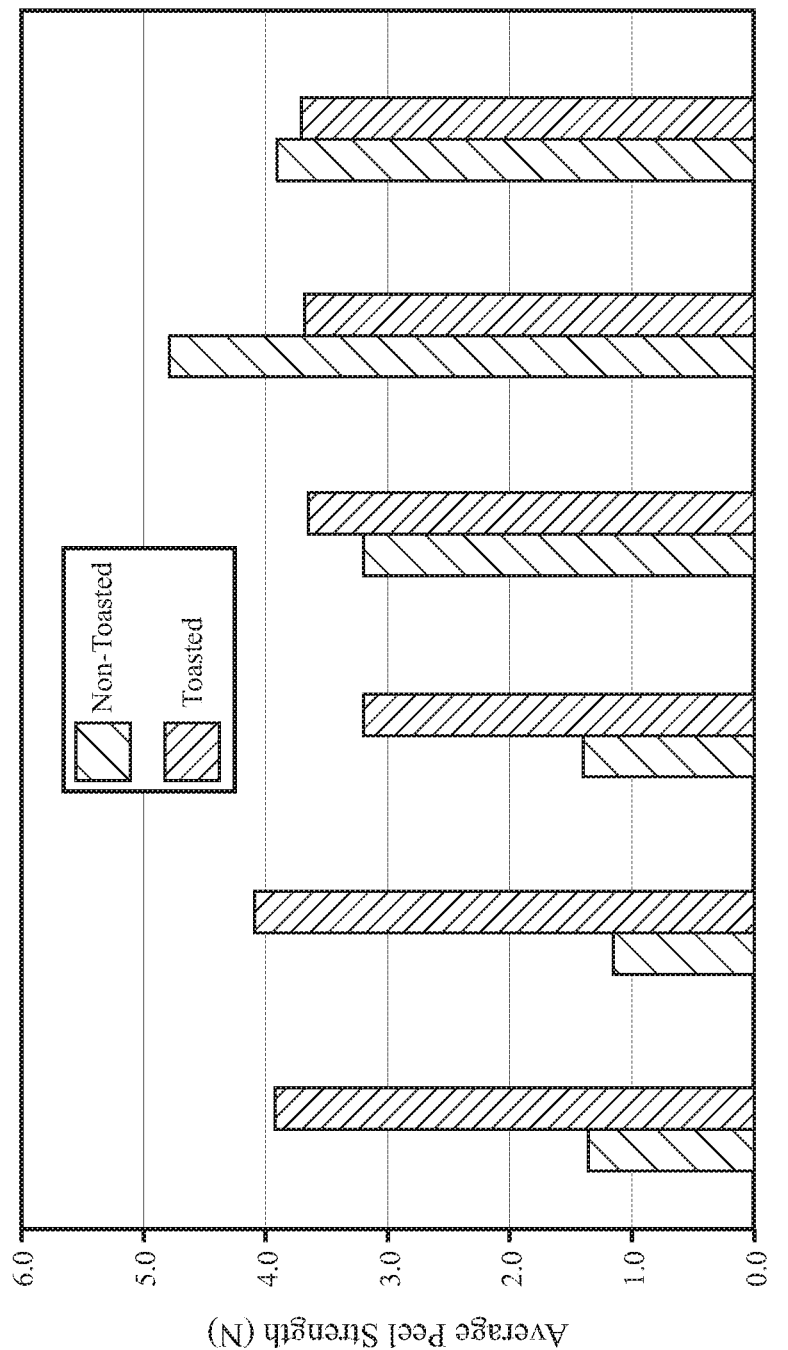
FIG. 16 is a graphical analysis comparing the peel strength between the second skin (on the "C side" of the substrate) and the polyurethane foam core of Examples 3, 4, and 5 and Comparative Examples 5, 6, and 7.
Figure 17:
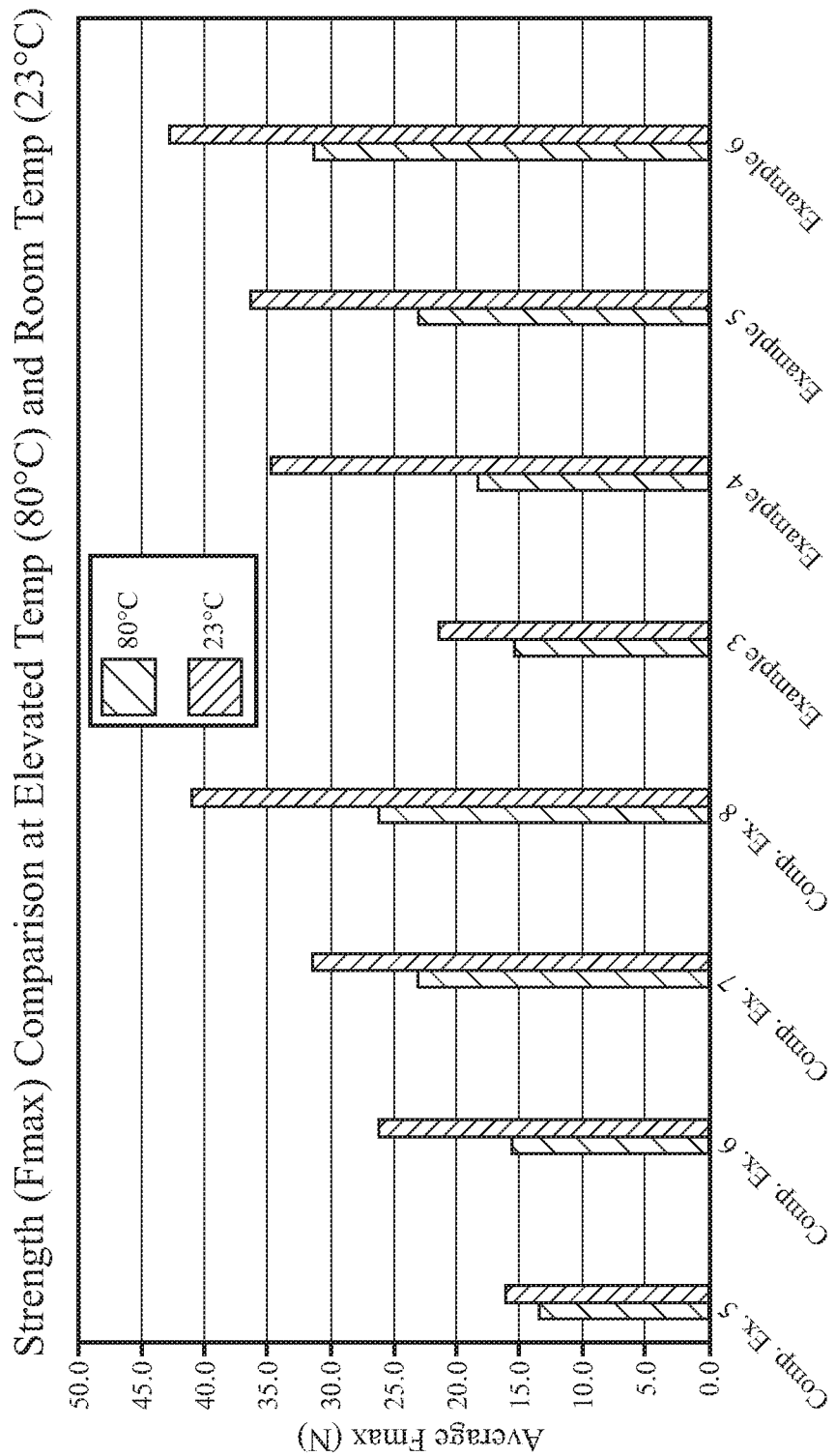
FIG. 17 is a graphical analysis of the strength of Examples 3-6 and Comparative Examples 5-8.

Referring now to FIGS. 15 and 16, the two additional layers comprising EAA copolymer film (13 gsm) surprisingly provide a robust bond between the polyurethane foam core and the first and second skins of the Examples. In fact, the two additional layers of the Examples comprising EAA copolymer are utilized at 13 grams per square meter whereas the two additional layers of the Comparative Examples comprising HDPE are used at 28 grams per square meter and the EAA copolymer still outperforms the HDPE. In other words, the Examples including the EAA copolymer generally outperform the Comparative Examples, which include over two times the HDPE. FIG. 15 is a graphical analysis comparing the peel strength between the first skin (on the "A side" of the substrate) and the polyurethane foam core of Examples 3, 4, and 5 and Comparative Examples 5, 6, and 7. FIG. 16 is a graphical analysis comparing the peel strength between the second skin (on the "C side" of the substrate) and the polyurethane foam core of Examples 3, 4, and 5 and Comparative Examples 5, 6, and 7. The "non-toasted" designation pertains to the substrate board condition after lamination. The "toasted" designation pertains to heating this board to approximately 200° C. and then compressing it lightly in a flat plaque tool to simulate the thermoforming operation.

Figure 18:
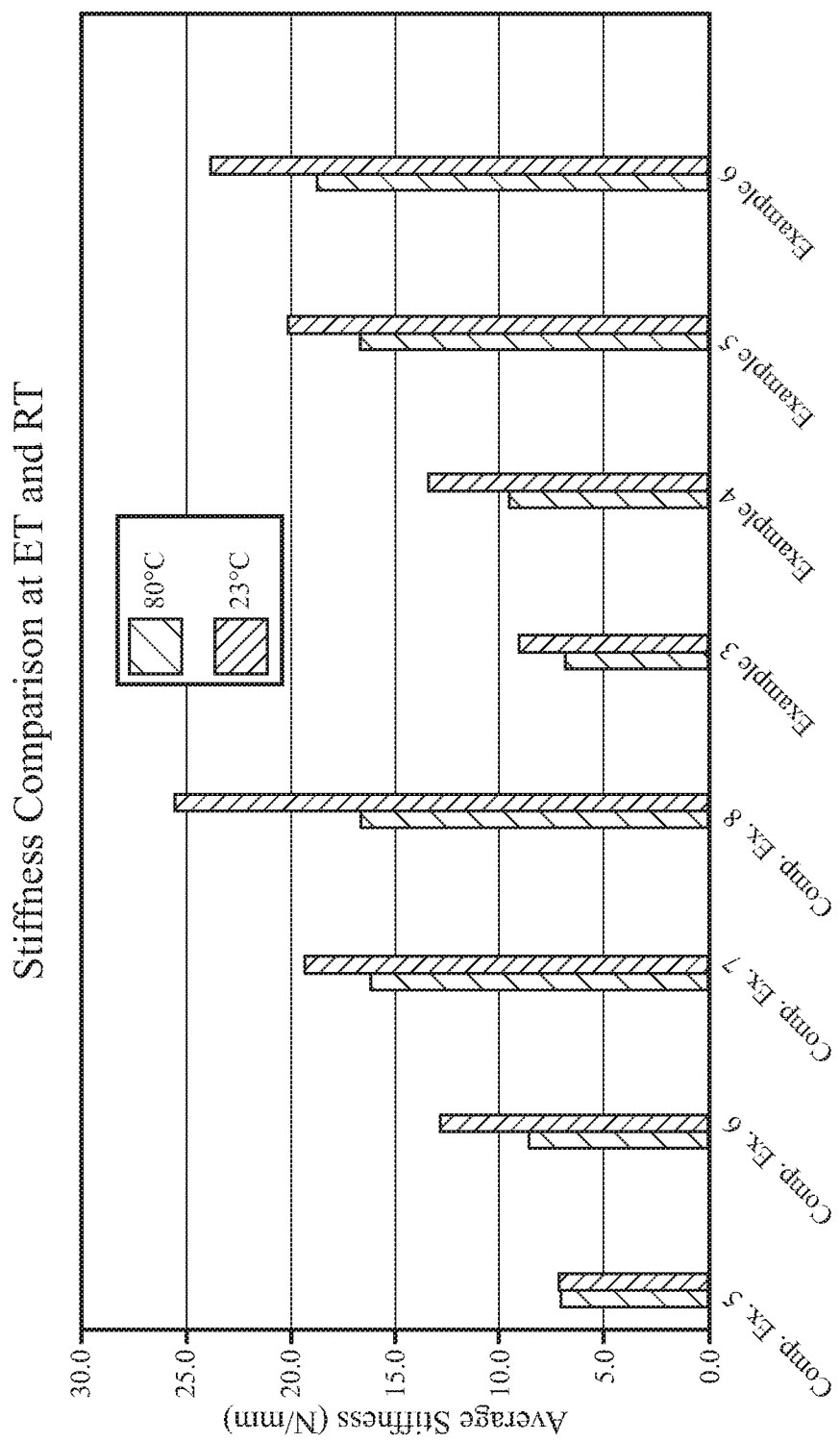
FIG. 18 is a graphical analysis of the stiffness of Examples 3-6 and Comparative Examples 5-8.

Examples 3-6 and Comparative Examples 5-8 are tested via a three point bending test which provides strength (Fmax), stiffness, and modulus of elasticity in bending (Emod) data. Referring now to FIG. 18, Examples 3-6 exhibit equal if not better strength than respective Comparative Examples 5-8. Referring now to FIG. 18, Examples 3-6 exhibit equal if not better stiffness than respective Comparative Examples 5-8.

Figure 19:
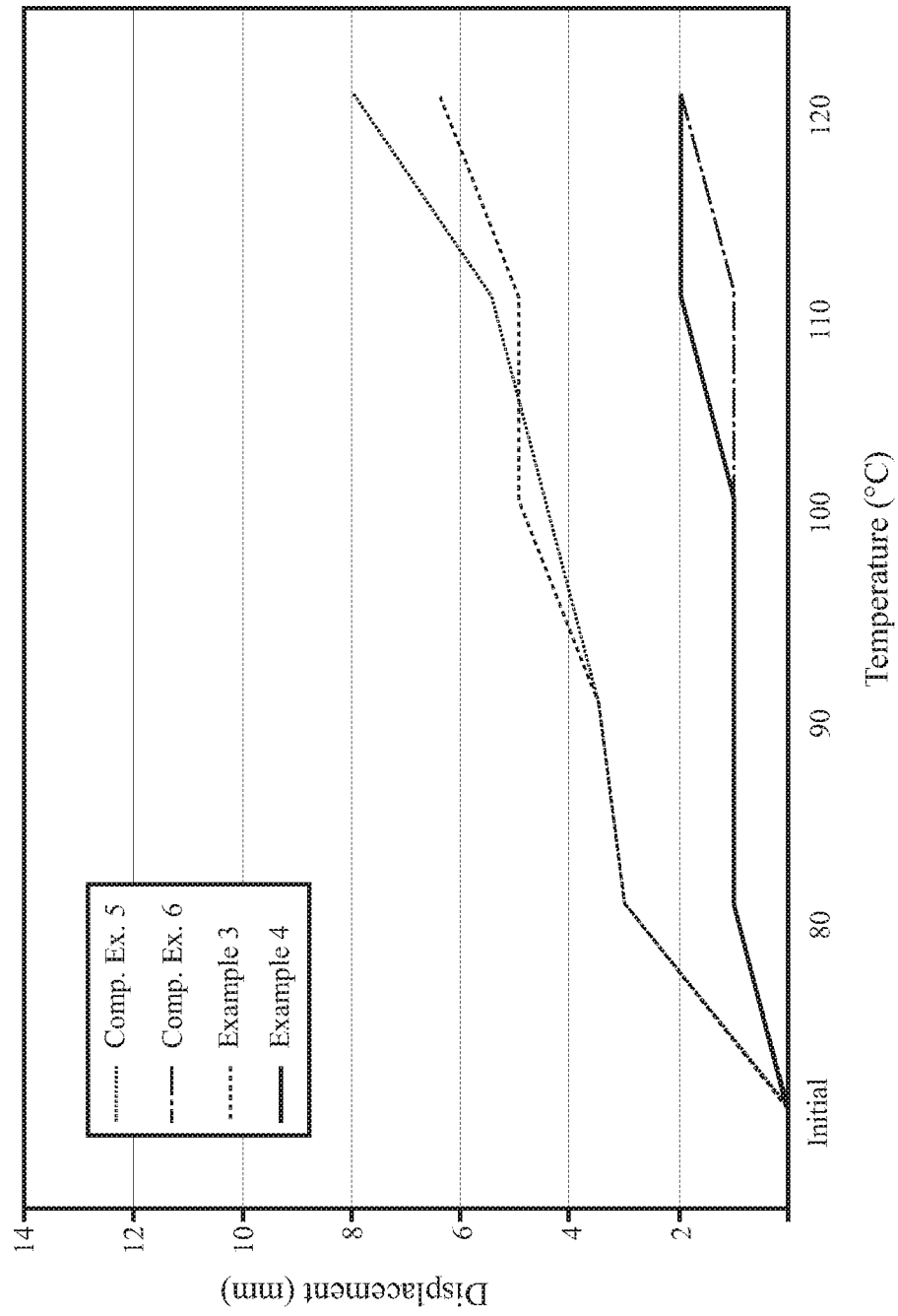
FIG. 19 is a graphical analysis of the sag of Examples 3 and 4 and Comparative Examples 5 and 6.

Sag testing is utilized to determine strength under high temperature. To test sag, 2"×10" samples of each respective Example/Comparative Example is held stationary at one end of the sample and a 22 g weight is placed on the other end of the sample. The samples are placed in an oven at 80° C. and their initial height is measured. Every hour for five hours the temperature increases by 10° C. and the drop in height, or "sag", is recorded. Referring now to FIG. 19, Examples 3 and 4 exhibit equal if not better sag than respective Comparative Examples 5 and 6.

In summary, Examples 3-6 exhibit significantly improved air flow and peel strength over the respective Comparative Examples. Notably, the peel strength significantly improved for the non-toasted board (i.e. lamination condition). This provides for a wider process window in lamination to meet specified non-toasted board peel strength requirements.

Figure 20:
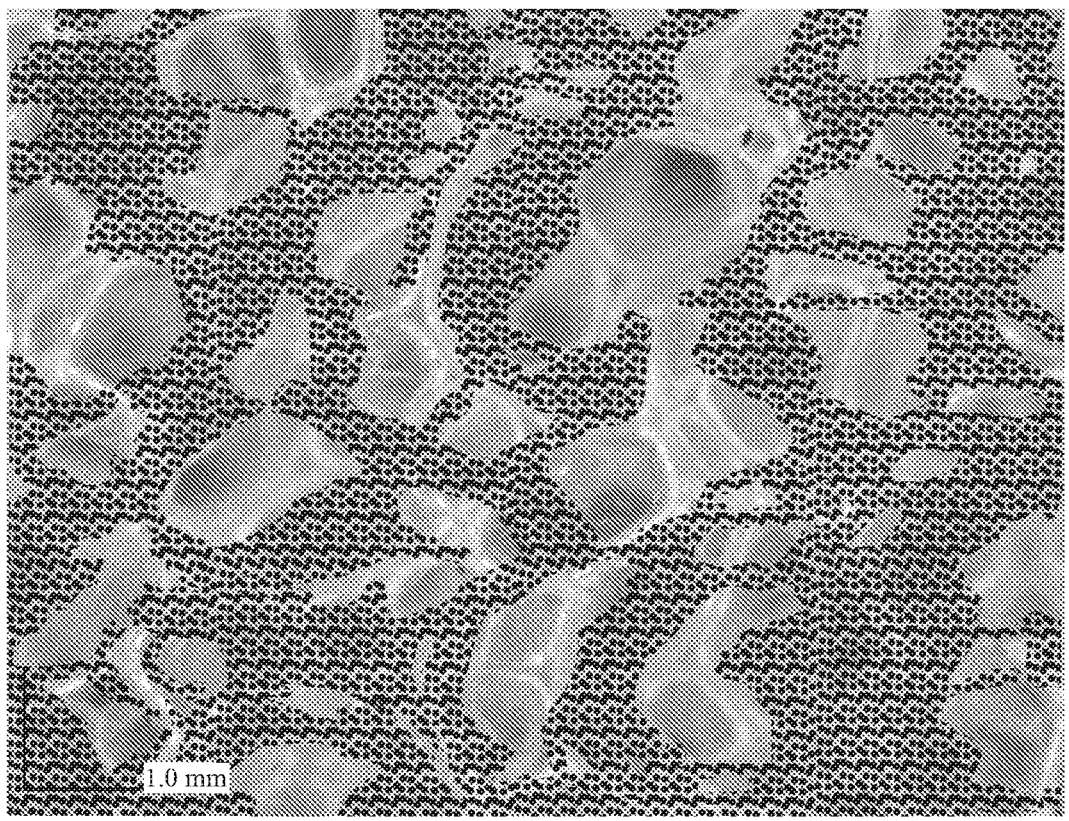
FIG. 20 is an enlarged image of the additional layer comprising the EAA copolymer and polyurethane foam core of Example 4.

From an air flow perspective, the additional layer comprising EAA copolymer provides excellent acoustic performance and peel in part because it melts to form a porous layer which has excellent adhesion to polyurethane. The additional layer comprising EAA copolymer (e.g. having thicknesses from about 5 to about 30, from 10 to about 20, or about 13 gsm (g/m$^2$)) has pores or openings similar to that of the polyurethane foam core layer. In FIG. 20, an enlarged image of the additional layer in Example 4 comprising EAA copolymer is shown covering portions of a surface of the foam core layer, while not covering various portions of the surface and pores of the foam core layer. The area of the surface that is covered by the additional layer comprising EAA is shown in stippling. FIG. 20 illustrates how the composite foam articles of this disclosure are able to maintain high air flow after the addition of the additional layer comprising EAA copolymer because the porosity of the polyurethane foam core in not impacted by the EAA copolymer. Advantageously, adhesion of the layers to the polyurethane foam core increases with use of the additional layer comprising EAA too.

Examples 3-6 also exhibit equivalent strength, stiffness, and sag relative to the respective Comparative Examples. Further, Examples 3-6 produce improved performance over comparative examples while having a reduced weight per square meter.

It is to be understood that the appended claims are not limited to express any particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the instant disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the instant disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The instant disclosure has been described in an illustrative manner, and it is to be understood that the terminology which has been used is intended to be in the nature of words of description rather than of limitation. Obviously, many modifications and variations of the instant disclosure are possible in light of the above teachings. It is, therefore, to be understood that within the scope of the appended claims, the instant disclosure may be practiced otherwise than as specifically described.

What is claimed is:
1. A composite foam article comprising:
   a polyurethane foam core presenting a first surface and a second surface facing opposite said first surface, said polyurethane foam core having a density of from 45 to 80 kg/m$^3$, and having a compression force deflection at

10% deflection of from 10 to 110 psi when measured in accordance with ASTM 3574-D;

a first skin which is porous and disposed on said first surface, said first skin comprising a plurality of fibers, a polymeric binder, and a polyolefin powder in addition to said polymeric binder of said first skin;

a second skin which is porous and disposed on said second surface, said second skin comprising a plurality of fibers, a polymeric binder, and a polyolefin powder in addition to said polymeric binder of said second skin;

a first additional layer comprising an ethylene and acrylic acid ("EAA") copolymer and disposed between said first surface of said polyurethane foam core and said first skin; and a second additional layer comprising an EAA copolymer and disposed between said second surface of said polyurethane foam core and said second skin;

wherein said composite foam article has a post-compression thickness of from 1.5 to 5 mm and a strength of greater than 17 N at a post-compression thickness of greater than 2 mm when tested in accordance with SAE J949 at 23° C.

2. The composite foam article set forth in claim 1 having a weight per unit area of from 500 to 1,000 g/m².

3. The composite foam article set forth in claim 1 having a weight per unit area of from 750 to 1,000 g/m².

4. The composite foam article set forth in claim 2, wherein said first and second skins cumulatively contribute from 25 to 60% of the total weight per unit area of said composite foam article.

5. The composite foam article set forth in claim 1, wherein said polymeric binder of each of said first and second skins independently comprises a polymer selected from polyethylene and polypropylene.

6. The composite foam article set forth in claim 1, wherein said fibers of each of said first and second skins independently comprise a material selected from polymeric, ceramic, glass, metal, mineral, and carbon.

7. The composite foam article set forth in claim 1, wherein said fibers of each of said first and second skins independently comprise a glass selected from E-glass (alumina-calcium-borosilicate), S2 glass (magnesium-alumino-silicate), C glass (calcium boro s ilic ate), R glass (calcium-alumino- silicate), silica, and quartz.

8. The composite foam article set forth in claim 1, wherein at least one of said first skin and said second skin further comprises a polyolefin film.

9. The composite foam article set forth in claim 1, wherein said polyurethane foam core has a compression force deflection at 10% deflection of from 30 to 95 psi when measured in accordance with ASTM 3574-D.

10. The composite foam article as set forth in claim 1 having a stiffness of greater than 3 N/mm when tested at a post-compression thickness of from 1.5 mm to 5 mm when tested in accordance with SAE J949 at 23° C.

11. The composite foam article set forth in claim 1 further comprising a catch layer comprising particles of carbon having a surface area of greater than 300 m²/g.

12. The composite foam article set forth in claim 11, wherein said particles of carbon are present in an amount of from 2 to 50 g/m².

13. The composite foam article set forth in claim 11, wherein said particles of carbon have a particle size of from 5 to 1,000 μm and/or a surface area of from 500 to 3,000 m²/g.

14. A vehicular headliner, a sunshade, a sun visor, a package tray, a seat back, or a load floor comprising said composite foam article set forth in claim 1.

15. The composite foam article set forth in claim 1, wherein said composite foam article has a post-compression thickness of from 2 to 4 mm.

16. The composite foam article set forth in claim 1, wherein said first and second additional layers are porous.

\* \* \* \* \*